US012629799B2

(12) United States Patent
Palmieri et al.

(10) Patent No.: US 12,629,799 B2
(45) Date of Patent: May 19, 2026

(54) GEMSTONE CENTERING DEVICE

(71) Applicant: Gemological Appraisal Association, Inc., New York, NY (US)

(72) Inventors: Angelo W. Palmieri, New York, NY (US); James Gleason, New York, NY (US); Donald A. Palmieri, New York, NY (US)

(73) Assignee: Gemological Appraisal Association, Inc., New York, NY (US)

( * ) Notice: Subject to any disclaimer, the term of this patent is extended or adjusted under 35 U.S.C. 154(b) by 325 days.

(21) Appl. No.: 18/134,213

(22) Filed: Apr. 13, 2023

(65) Prior Publication Data

US 2024/0342864 A1 Oct. 17, 2024

(51) Int. Cl.
| | |
|---|---|
| *B25B 5/02* | (2006.01) |
| *B23Q 3/18* | (2006.01) |
| *B25B 1/02* | (2006.01) |
| *B25B 1/06* | (2006.01) |

(52) U.S. Cl.
CPC ............... *B25B 5/02* (2013.01); *B23Q 3/183* (2013.01); *B25B 1/02* (2013.01); *B25B 1/06* (2013.01)

(58) Field of Classification Search
CPC ........... B25B 1/02; B25B 1/2405; B25B 1/06; B23Q 3/183; Y10T 279/17717; Y10T 279/1926
USPC .................................................. 279/71, 114
See application file for complete search history.

(56) References Cited

U.S. PATENT DOCUMENTS

| | | | | |
|---|---|---|---|---|
| 3,945,654 | A | * | 3/1976 | McMullen ............ B23B 31/102 279/154 |
| 3,947,120 | A | | 3/1976 | Bar-issac et al. |
| 9,488,588 | B2 | | 11/2016 | Palmieri et al. |
| 9,746,422 | B2 | | 8/2017 | Palmieri et al. |
| 10,036,711 | B2 | | 7/2018 | Palmieri et al. |
| 2011/0031707 | A1 | * | 2/2011 | Chen ..................... B23P 11/027 279/142 |

FOREIGN PATENT DOCUMENTS

| | | |
|---|---|---|
| WO | 2015183947 | 12/2015 |

* cited by examiner

*Primary Examiner* — Christopher J. Besler
(74) *Attorney, Agent, or Firm* — Leason Ellis LLP

(57) ABSTRACT

A gemstone centering device includes a platform for receiving the gemstone and two pairs of arms. The pair of first arms arranged opposite one another above the platform and movable along a first axis. The pair of first arms move between a retracted position and an extended position in which a distance between first gem contacting surfaces of the pair of first arms is less than in the retracted position. The pair of second arms are arranged opposite one another above the platform and movable along a second axis. The pair of second arms move between a retracted position and an extended position in which a distance between second gem contacting surfaces of the pair of second arms is less than in the retracted position. Movement of the pair of first arms is independent from movement of the pair of second arms.

19 Claims, 37 Drawing Sheets

GEMSTONE CENTERING DEVICE

TECHNICAL FIELD

The present disclosure is directed to analytical devices and systems relating to gemstones and more particular, to a gemstone centering device that centers the gemstone on a platform to permit further processing of the gemstone, such as imaging and/or classifying and recording information with respect to the gemstone. In one embodiment, the gemstone centering device can be part of a system that provides an owner with an accurate optical identification of the gemstone and provides wholesale and retail establishments, law enforcement, government, and insurance agencies with a verification system.

BACKGROUND

Evaluation of gemstones is a critical task in order to value and also to record unique identification information of the gemstone. For example, in the simplest form, photographs can be taken of the gemstone. In most assessment and identification processes, it is helpful if not necessary to center the gemstone typically on a platform, such as a glass plate. This centering allows the gemstone to be centered relative to an imaging device, such as a camera, or other device.

Gemstones have their own unique optical response and this optical response can be used for accurate identification of the gemstones. In this regard. U.S. Pat. No. 3,947,120 discloses an arrangement for providing an optical fingerprint of a gemstone where a laser beam is focused on a gemstone and the optical response of the gemstone is recorded on a recording medium, preferably a photographic medium. This arrangement provides a fingerprint of the gemstone which is reproducible and has been held by the courts to be sufficient evidence to prove that the gemstone under consideration having a certain optical response is the same as a previously identified gemstone having essentially the same optical response.

Accordingly, obtaining an optical fingerprint of the gemstone is one application in which it is desirable and/or necessary to center the gemstone. The following non-exhaustive list is of Applicants own patents that disclose improvements to systems for recording the optical fingerprint of gemstones: PCT/US2015/032663; U.S. Pat. Nos. 9,488,588; 10,036,711; and 9,746,422, each of which is hereby expressly incorporated by reference in its entirety.

There is therefore a need to provide a simple, yet effective way to center a gemstone on a platform, such as a plate of glass and the gemstone centering device and related system disclosed herein provide such a solution.

SUMMARY

In one embodiment, a gemstone centering device includes a platform for receiving the gemstone and two pairs of arms. The pair of first arms arranged opposite one another above the platform and movable along a first axis. The pair of first arms move between a retracted position and an extended position in which a distance between first gem contacting surfaces of the pair of first arms is less than in the retracted position. The pair of second arms are arranged opposite one another above the platform and movable along a second axis. The pair of second arms move between a retracted position and an extended position in which a distance between second gem contacting surfaces of the pair of second arms is less than in the retracted position. Movement of the pair of first arms is independent from movement of the pair of second arms.

In one embodiment, a gemstone centering device includes a platform for receiving the gemstone and a base having a center opening. The base also includes a first pair of recessed tracks opposite one another and a second pair of recessed tracks opposite one another. Two first arms are movably disposed with the first pair of recessed tracks along a first axis. The two first arms have first gem contacting surfaces for contacting and moving the gemstone along the platform. Two second arms are movably disposed within the second pair of recessed tracks along a second axis. The pair of second arms have second gem contacting surfaces for contacting and moving the gemstone along the platform. A first actuator is operatively coupled to the pair of first arms for moving the pair of first arms within the first pair of recessed tracks; and a second actuator is operatively coupled to the pair of second arms for moving the pair of second arms within the second pair of recessed tracks. Movement of the pair of first arms is independent from movement of the pair of second arms.

In one embodiment, a gemstone centering device includes a platform for receiving the gemstone and a base that has a center opening. The device has a first manually operated centering assembly that has first gem contacting surfaces for contacting and moving the gemstone along the platform. The first manually operated centering assembly has a first actuator for moving the first gem contacting surfaces both towards one another and away from one another. The device further includes a second manually operated centering assembly that has second gem contacting surfaces for contacting and moving the gemstone along the platform. The second manually operated centering assembly has a second actuator for moving the second gem contacting surfaces both towards one another and away from one another. The movement of the first gem contacting surfaces is independent from movement of the second gem contacting surfaces; and wherein the first gem contacting surfaces are oriented perpendicular to the second gem contacting surfaces.

BRIEF DESCRIPTION OF THE DRAWING FIGURES

DETAILED DESCRIPTION OF CERTAIN EMBODIMENTS

Figure 1:
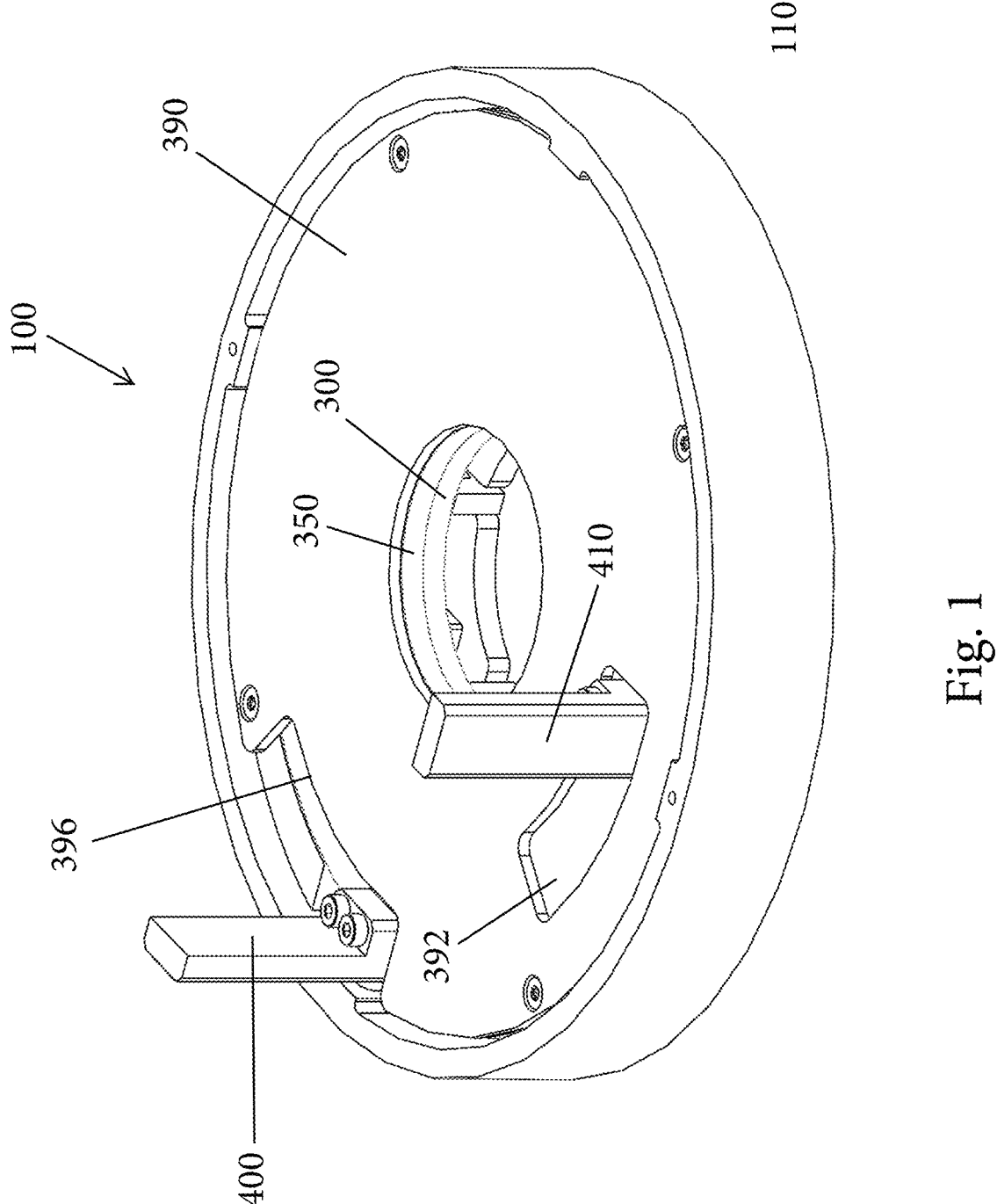
FIG. 1 is a perspective view of a gemstone centering device in accordance with one embodiment.
Figure 2:
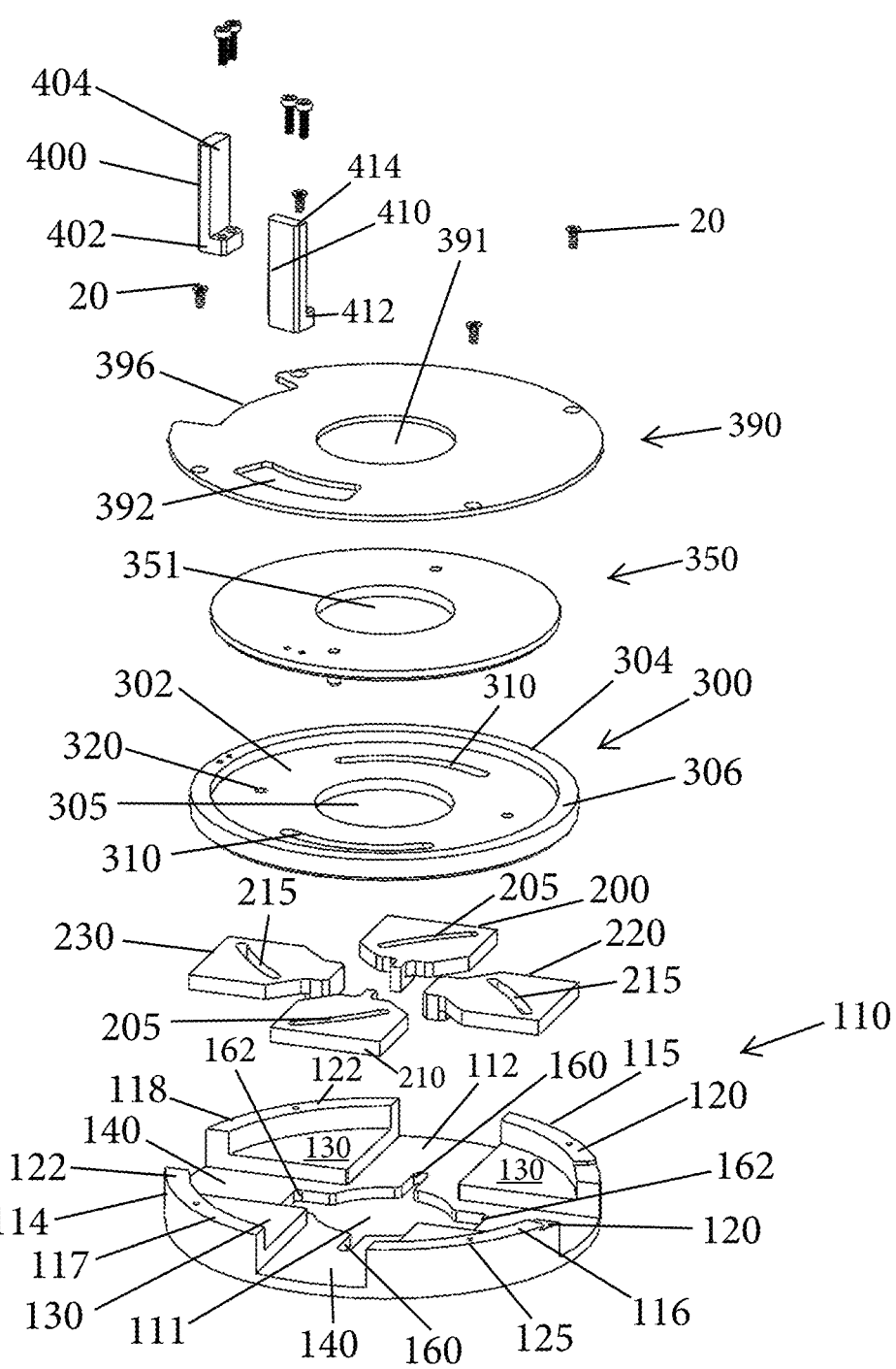
FIG. 2 is a first exploded perspective view of the device of FIG. 1.
Figure 3:
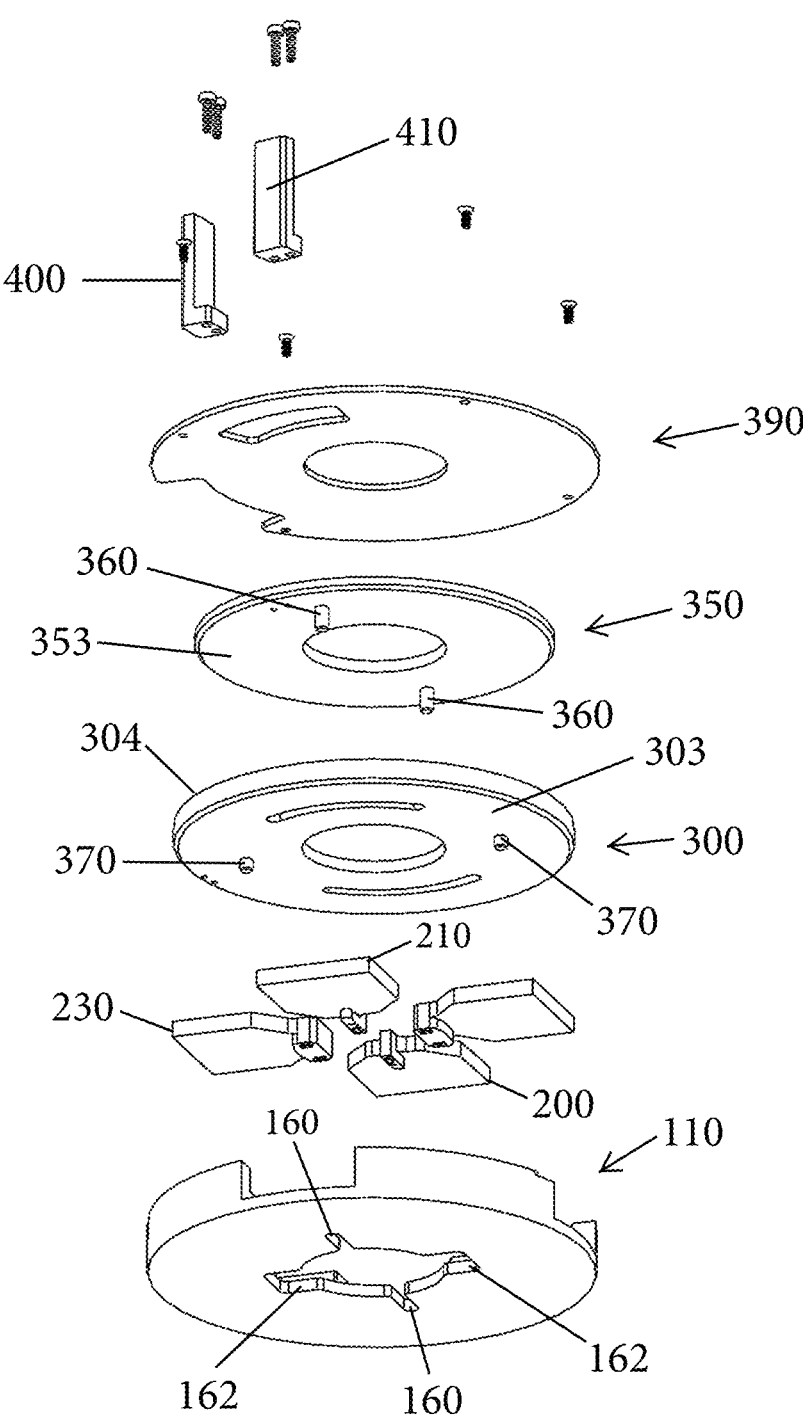
FIG. 3 is a second exploded perspective view.

FIGS. 1-37 illustrate a gemstone centering device 100 in accordance with one embodiment. As described in more detail below, the gemstone centering device 100 can be incorporated into a larger system, such as a gemstone identification system. The gemstone centering device 100 is formed of a number of parts that are assembled together as illustrated and described herein. Each of these main parts is described below.

The gemstone centering device 100 includes a base 110 that has a center opening 111 formed therein. As discussed herein, the center opening 111 has an irregular but symmetric shape. The center opening 111 passes completely through the base 110 and in certain embodiments in which a laser is used, the laser is positioned below and directed toward the center opening 111. The base 110 is a multi-level structure as described below and is not limited to having a circular shape as shown in the drawing figures.

The multi-level structure of the base 110 is as follows. The base 110 includes a bottom wall or floor 112 from which a side wall 114 extends upwardly. The side wall 114 is formed at a 90-degree angle relative to the floor 112. The side wall 114 is also not continuous in that it is a segmented wall. In particular, as shown, the side wall 114 is segmented so as to define four discrete sections 115, 116, 117, 118, each of which has an arcuate shape. These four sections 115, 116, 117, 118 are located in two pairs, namely, a first pair containing sections 115, 116 and a second pair containing sections 117, 118. Section 115 is located 180 degrees apart from section 117 and section 118 is located 180 degrees apart from section 118. Sections 115, 116 can be located on one half of the circular shaped base 110 and sections 117, 118 are located on the other half of the circular shaped base 110.

The arcuate lengths of the illustrated four sections 115, 116, 117, 118 are the same. The four sections 115, 116, 117, 118 have similar shapes but there is at least one difference between sections 115, 116 and sections 117, 118. More particularly, each of the sections 115, 116 has a stepped top edge 120 in that that top edge 120 of each of these sections 115, 116 is not planar. Conversely, a top edge 122 of each of sections 117, 118 is planar and does not include any step. A lower section of the stepped top edge 120 of each of the sections 115, 116 are spaced apart but located opposite one another. In other words, the lower sections are located at ends of the top edge 120 that are closest to one another. Each of the sections 115, 116, 117, 118 includes an elevated floor 130 that is elevated relative to the main floor 112 of the base 110. The elevated floor 130 is pie or wedge shaped and terminates at a location spaced from the center opening 111.

Each of the top edges 120, 122 can include an opening 125 for receiving a fastener to permit attachment of another part to the base 110 as described herein.

Between the sections 115, 116, 117, 118 there are open spaces that can be considered to be guide tracks 140 that permit, as described herein, parts to slidingly travel along the guide tracks 140 in opposite directions toward and away from the center opening 111. The lengths and widths of the guide tracks 140 can be the same as shown. The four guide tracks 140 are located 90 degrees apart from one another. The guide tracks are recessed relative to the elevated floors 130 of the sections 115, 116, 117, 118.

As mentioned, the center opening 111 has an irregular shape. The center opening 111 can have a circular shaped center but includes a series of circumferentially spaced notches that extend radially outward from the circular shaped center. More specifically, there can be a first pair of notches 160 that are located 180 degrees apart from one another and a second pair of notches 162 that are located 180 degrees apart from one another. The notches 160 are centrally located within two respective guide tracks 140 and the notches 162 are centrally located within the other two respective guide tracks 140. The lengths (in longitudinal direction away from center of the opening 111 and the base 110) of the notches 160, 162 are the same, while the widths are different. In particular, the notches 160 are narrower in width, while the notches 162 are wider. Each notch 160, 162 thus has an open end that opens into the center opening 111 and an opposite closed end that is radially outward from the center of the opening 111. In the illustrated embodiment, the notches 162 are formed within the base 110 such that one notch 162 is located between the sections 115, 116 (the other is between sections 117, 118).

Figure 4:
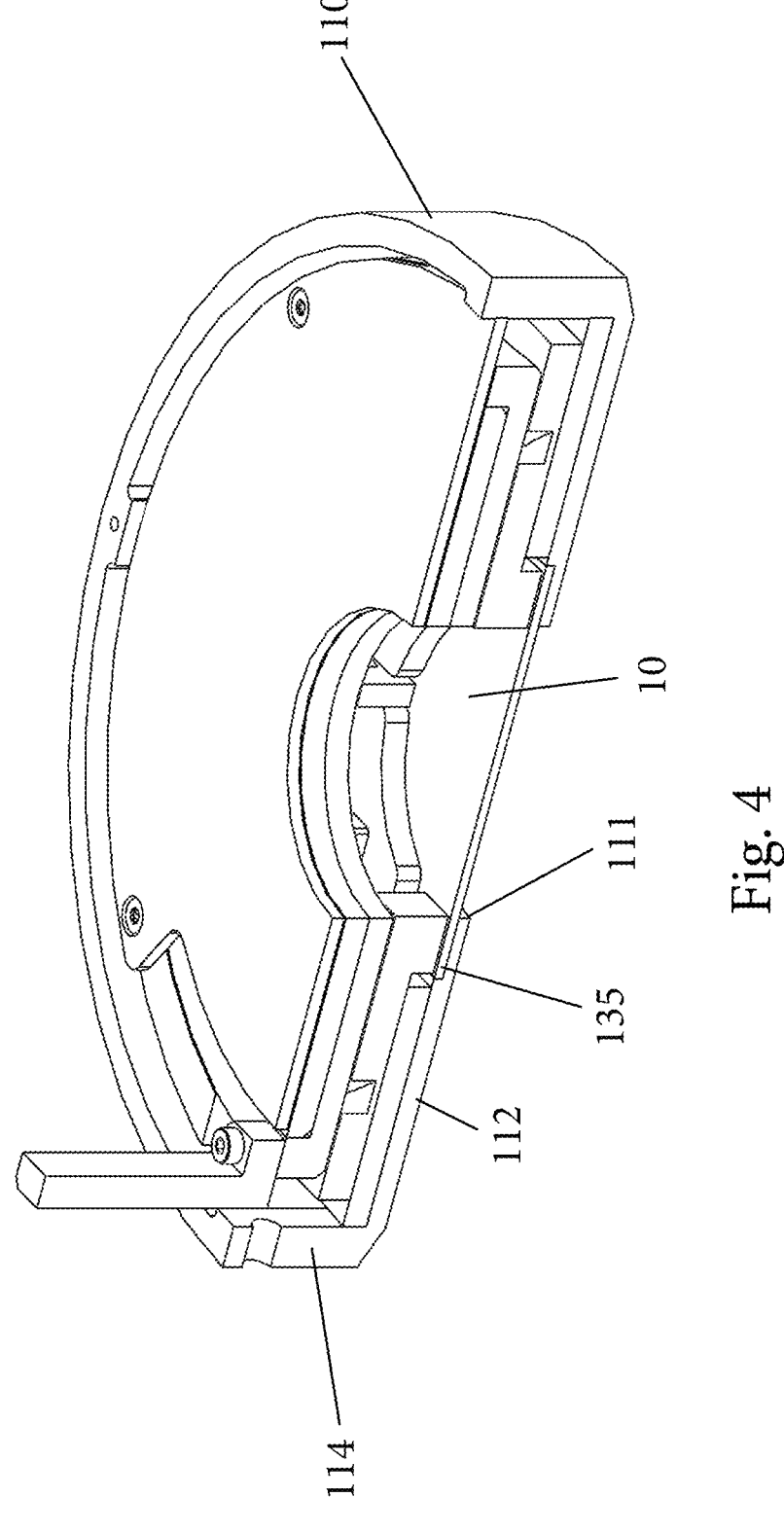
FIG. 4 is a perspective cross-sectional view of the device.

As shown in the cross-sectional view of FIG. 4, the base 110 can include a ledge 135 that surrounds the center opening 111. The ledge 135 is configured to support a platform 10, such as a glass plate, on which the gemstone can be placed. The platform 10 thus is contained within and closes off the center opening 111 along the bottom of the base 110 so that the platform 10 completely covers the center opening 111 and allows the gemstone to move (slide) along the top surface of the platform 10.

The gemstone centering device 100 also includes a plurality of slidable (movable) arms 200, 210, 220, 230 that are disposed within the guide tracks 140. As described herein, each arm 200, 210, 220, 230 moves within one respective guide track 140 in a direction toward and away from the center opening 111. The arms 200, 210, 220, 230 are arranged in pairs with the arms 200, 210 belonging to a first pair of arms and the arms 220, 230 belonging to a second pair of arms.

The first pair of arms 200, 210 move together in unison but move independently from the second pair of arms 220, 230 which likewise move in unison together. As described herein, the movement of the first pair of arms 200, 210 is designed to move the gemstone on the platform 10 along a first direction, while the movement of the second pair of arms 220, 230 is designed to move the gemstone in a second direction different than the first direction. In one embodiment, the first direction can be characterized as being a north/south direction, while the second direction can be characterized as being an east/west direction. The north/south direction can be the longer axis of the gemstone, while the east/west direction can be the shorter axis of the gemstone. The first pair of arms 200, 210 is designed to move the gemstone in the first direction on the platform as part of the gemstone centering process and the second pair of arms 220, 230 move the gemstone in the second direction on the platform. As described herein, the arms 200, 210, 220, 230 are sized relative to the guide tracks 140 to allow the arms to only move in an axial direction toward and away from the center of the base 110 and the center opening 111. The width of each arm 200, 210, 220, 230 is the same or slightly less than the width of the guide track 240 so that the arms are mechanically (frictionally) held within the guide tracks 240 but axial movement is permitted.

Each of the arms 200, 210 includes a rear section and a forward section. The rear section is generally square shaped, with parallel side edges and a rear edge that is between and perpendicular to the side edges. The forward section has angled sides that lead to a first protrusion 201. The first protrusion 201 defines the forward most end of the arm 200, 210. The illustrated first protrusion 201 has a rectilinear shape and has a first length (L1) and a first width (W1). The blunt forward end 203 of the first protrusion 201 lies parallel to the rear edge of the arm 200, 210.

Each of the arms 220, 230 includes a rear section and a forward section. The rear section is generally square shaped, with parallel side edges and a rear edge that is between and perpendicular to the side edges. The forward section has angled sides that lead to a second protrusion 221. The second protrusion 221 defines the forward most end of the arm 220, 230. The illustrated second protrusion 221 has a rectilinear shape and has a second length (L2) and a second width (W2). The blunt forward end 223 of the second protrusion 221 lies parallel to the rear edge of the arm 220, 230.

The blunt forward ends 203 define first gem contacting surfaces and similarly, the blunt forward ends 223 define second gem contacting surfaces.

Each of the first arms 200, 210 moves between a first position (retracted position) and a second position (extended position) relative to the center opening 111. Similarly, each of the second arms 220, 230 moves between a first position (retracted position) and a second position (extended position) relative to the center opening 111. The retracted positions of the first arms 200, 210 and the second arms 220, 230 are ones in which the first and second protrusions 201, 221, respectively, are located further away from the center of the center opening 111, while the extended positions of the first arms 200, 210 and the second arms 220, 230 are ones in which the first and second protrusions 201, 221, respectively, are located closest to the center of the center opening 111.

FIGS. 7-15 illustrate the progressive, incremental movements of the arms 220, 230 (FIGS. 7-11) from the retracted positions to the extended positions and FIGS. 12-15 illustrate the progressive, incremental movements of the arms 200, 210 (FIGS. 12-15) from the retracted positions to the extended positions.

Figure 11:
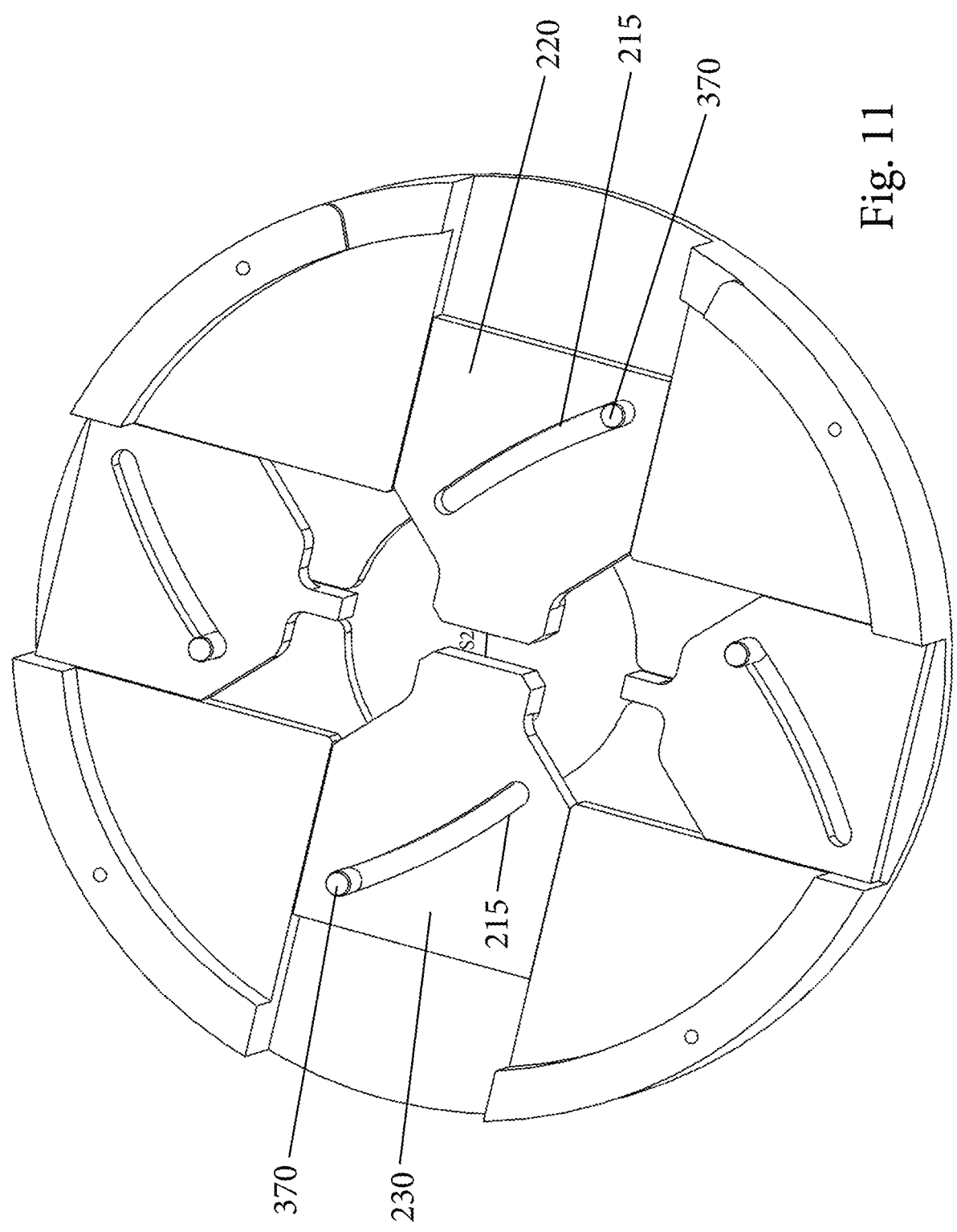
FIG. 11 is a top perspective view showing a plurality of movable arms arranged on a base and being shown in a fifth position.
Figure 15:
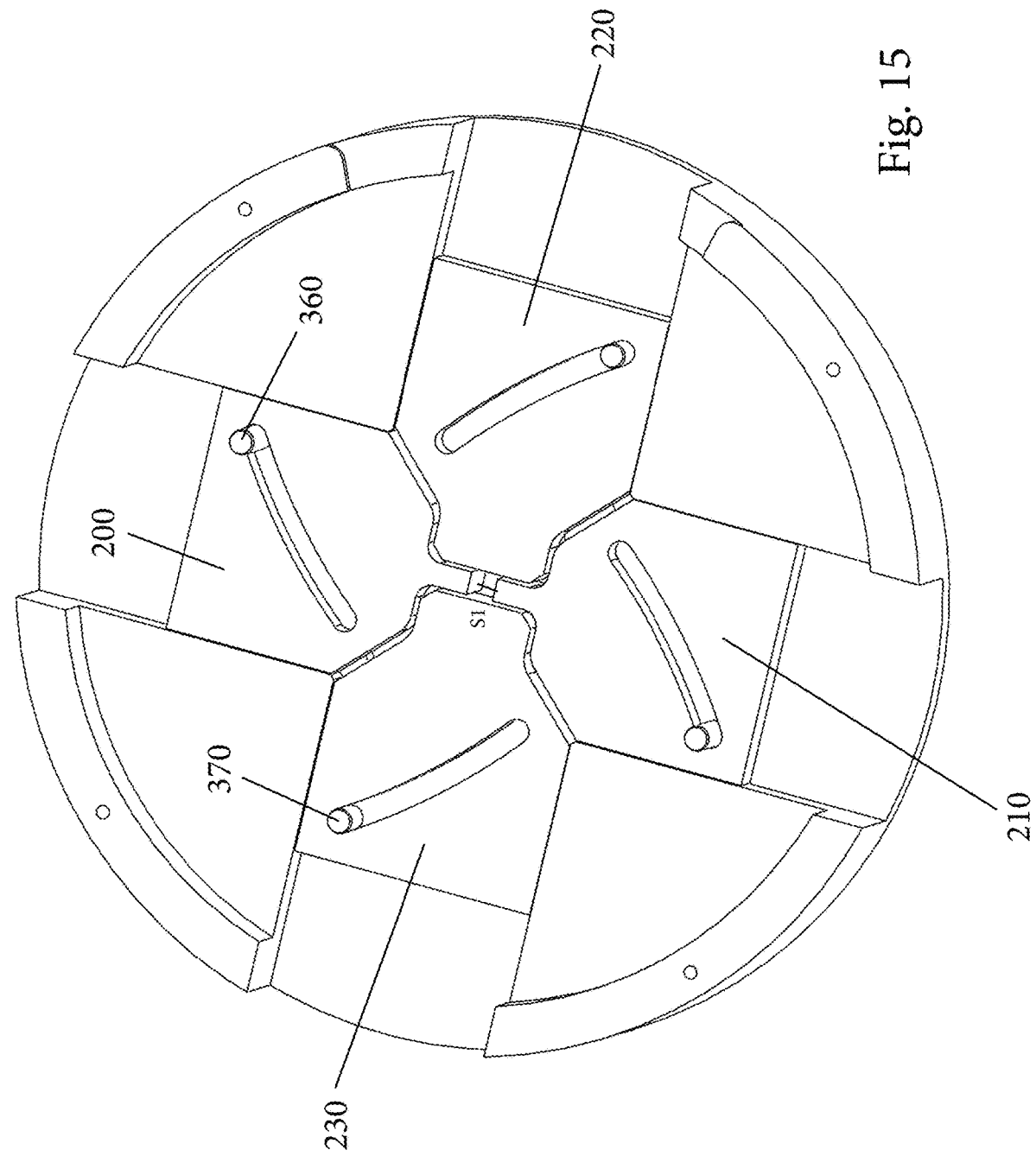
FIG. 15 is a top perspective view showing a plurality of movable arms arranged on a base and being shown in a ninth position.
Figure 16:
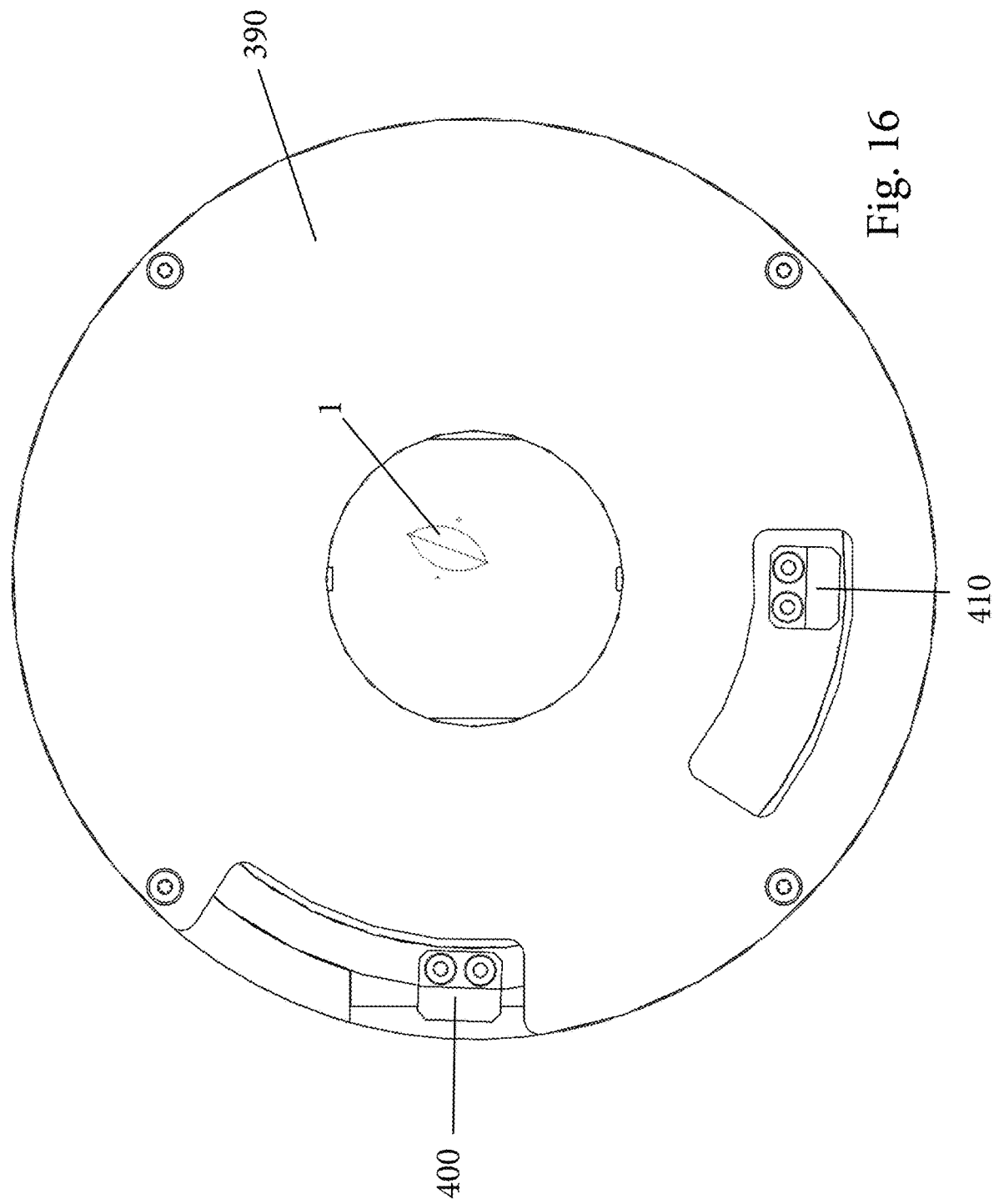
FIG. 16 is a top perspective view showing a first gemstone in an initial position prior to centering.
Figure 17:
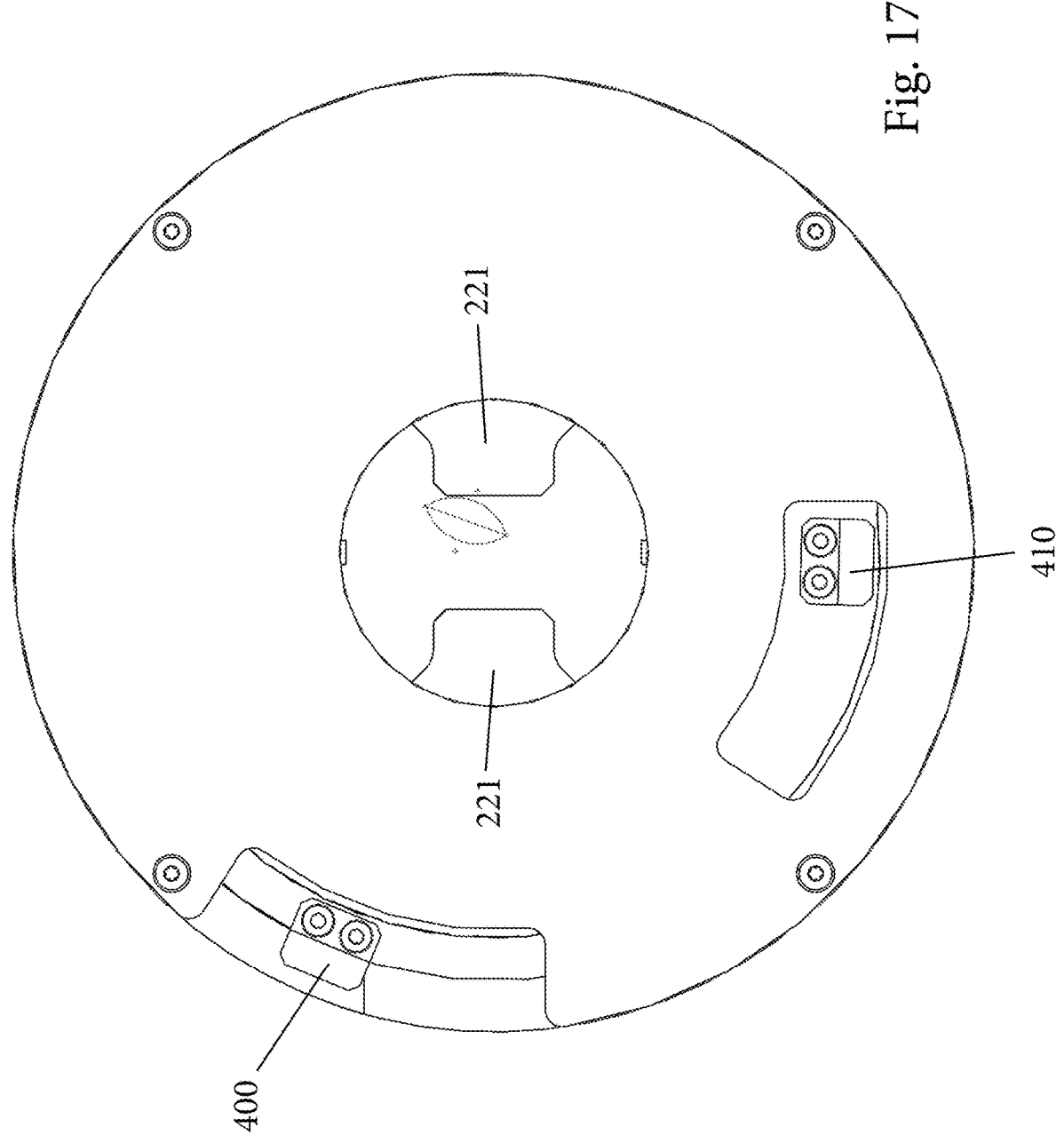
FIG. 17 is a top perspective view showing a first step in centering the first gemstone.
Figure 18:
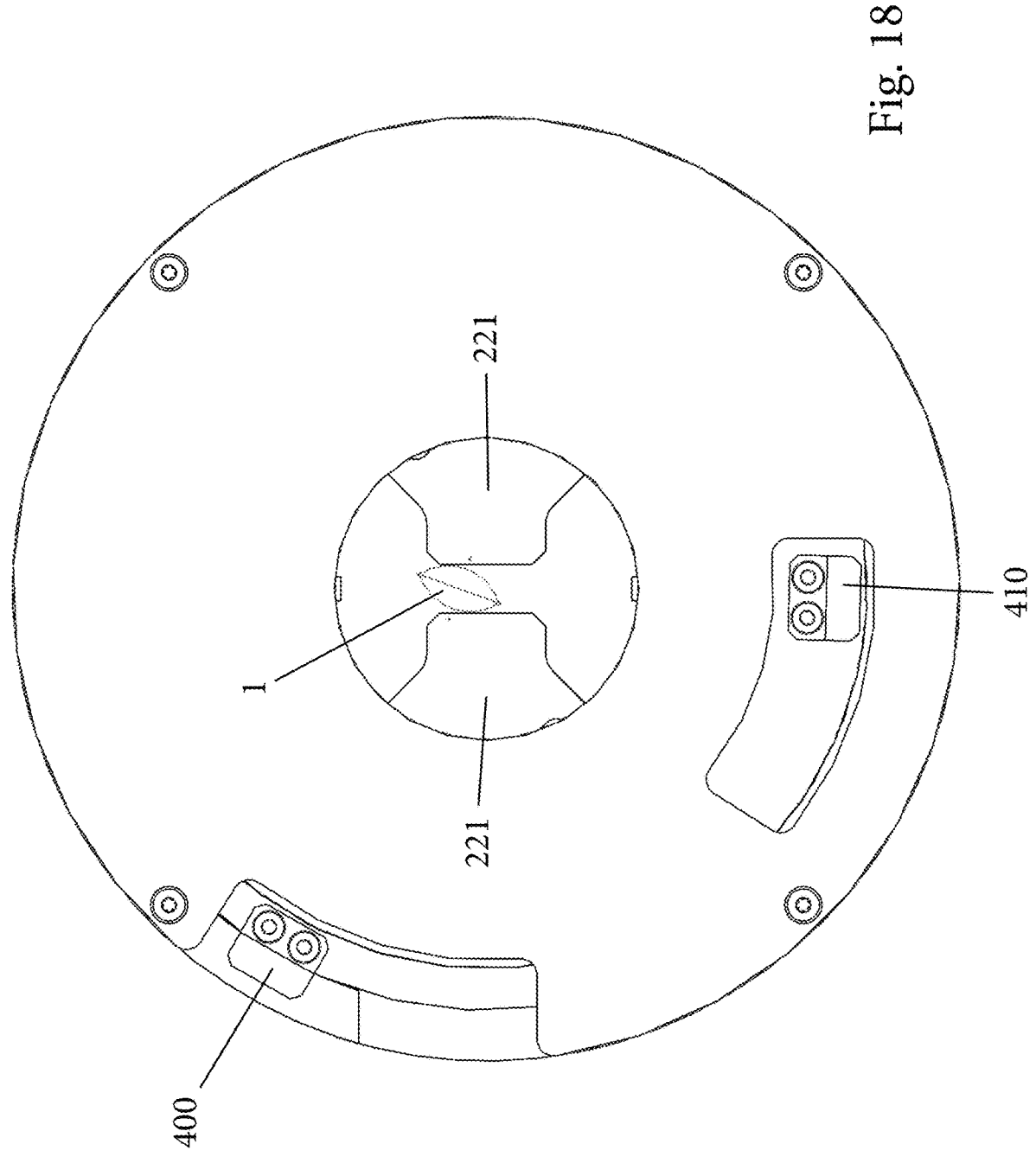
FIG. 18 is a top perspective view showing a second step in centering the first gemstone.
Figure 19:
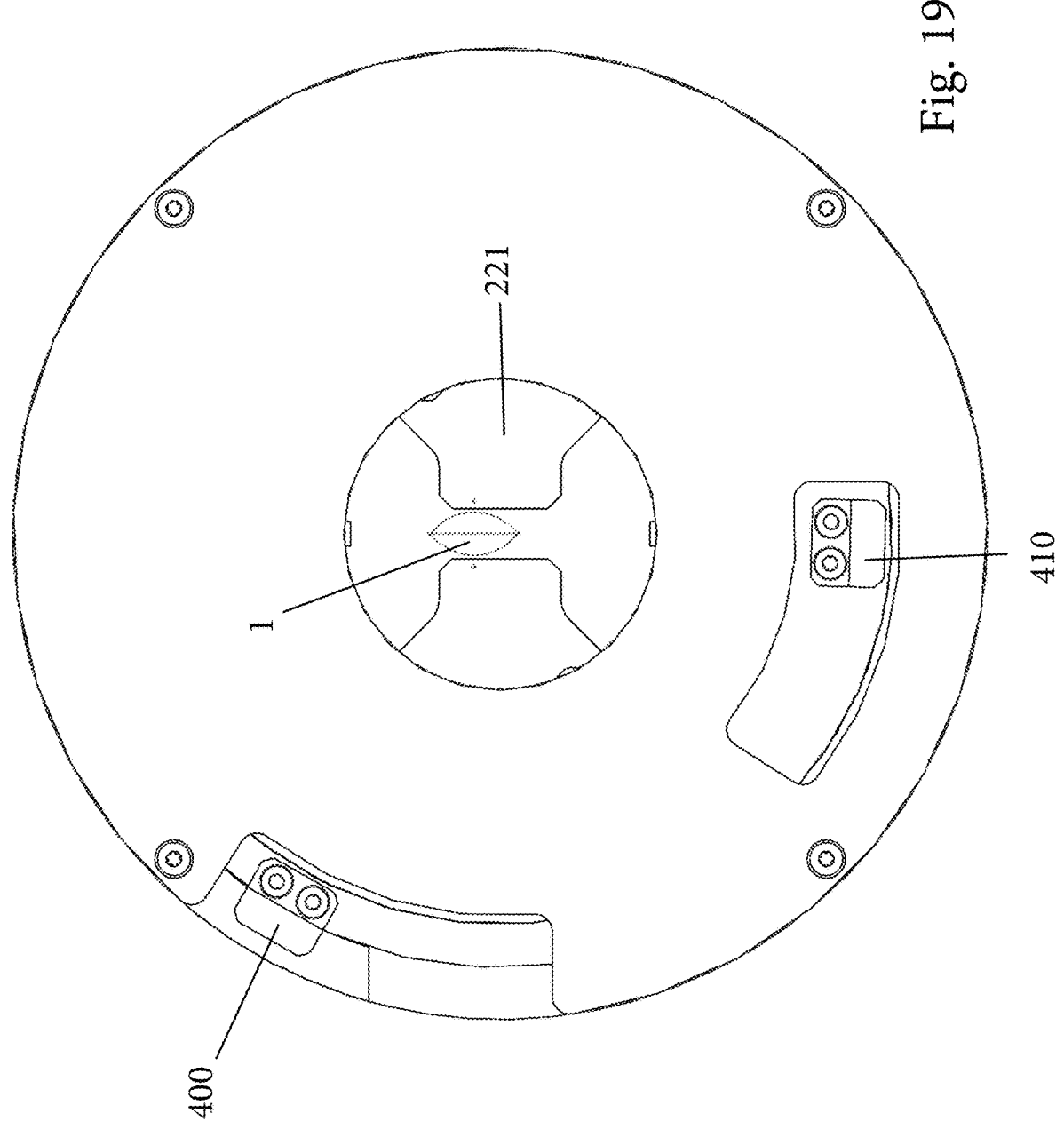
FIG. 19 is a top perspective view showing a third step in centering the first gemstone.

In their extended positions, the first protrusions 201 of the first arms 200, 210 do not contact one another but instead there is a first space (S1) formed therebetween (FIG. 15). Similarly, in their extended positions, the second protrusions 221 of the second arms 220, 230 do not contact one another but instead there is a second space (S2) formed therebetween (FIG. 11). In addition, in the illustrated embodiment, while the first protrusions 201 are received and travel axially within the second space (S2), the first protrusions 201 do not contact the second protrusions 221. The angled nature of the sides of the forward sections of the first arms 200, 210 and the second arms 220, 230 permit the nesting of the arms 200, 210, 220, 230 in their extended positions; however, while located very close to one another, the arms 200, 210, 220, 230 do not directly touch and contact one another in their extended positions.

It will be appreciated that the blunt forward end 223 has more surface area than the blunt forward end 203 to assist in centering the gemstone on the platform 10. The greater surface areas of the opposing blunt forward ends 223 help move an off-centered gemstone as the opposing blunt forward ends 223 move inwardly toward one another. The continued movement of the arms 220, 230 results in the reduction of the second space (S2) and centers the gemstone along one axis (i.e., the long axis of the gemstone for non-round shaped gemstones when the gemstone is properly initially positioned on the platform 10).

The degree of (axial) travel of the first arms 200, 210 between the retracted and extended positions is the same as the degree of (axial) travel of the second arms 220, 230 between the retracted and extended positions.

Each of the arms 200, 210, 220, 230 includes a slot and more specifically, each of the arms 200, 210 includes a first slot 205 and each of the arms 220, 230 includes a second slot 215. Each of the first slot 205 and the second slot 215 is closed at each end. The first slot 205 has a first length and the second slot 215 has a second length. As described herein, the first slot 205 and the second slot 215 is diagonally formed. In particular, one end of the first slot 205 and the second slot 215 is located at a bottom left corner of the arm and extends diagonally such that the other end of the slot is located at a top right corner of the arm.

Each of the arms 200, 210, 220, 230 are constructed to be received within and move within the notches 160, 162. More specifically, the protrusions 201, 221 are received within the notches 160, 162. In particular, a bottom section of each protrusion 201 extends below a bottom surface of the rear section of the arm 200, 210 as shown in the figures. Similarly, a bottom section of each protrusion 221 extends below a bottom surface of the rear section of the arm 220, 230 as shown in the figures. The protrusions 201 are received within the notches 160, while the protrusions 221 are received within the notches 162. It will be appreciated that the protrusions 201, 221 move linearly within the notches 160, 162, respectively, as the arms 200, 210, 220, 230 move between the retracted and extended positions.

As described in more detail herein, the functions of the pair of first arms 200, 210 and the pair of second arms 220, 230 are to center a gemstone that is placed on the platform with precision. The first pair of arms 200, 210 and the second pair of arms 220, 230 move in series (succession).

The gemstone centering device 100 also includes an outer ring 300 and an inner ring 350 for independently controlling the movement, respectively, of the first pair of arms 200, 210 and the second pair of arms 220, 230.

When received within the side wall of the base 110, the outer ring 300 sits on the elevated floors 130 of the sections 115, 116, 117, 118 and rotates thereon.

The outer ring 300 has a bottom wall or floor 302 with a peripheral side wall 304 extending along and upwardly from a perimeter of the floor 302. The outer ring 300 has an annular shape and is defined by a center hole 305. The center hole 305 has a circular shape. The presence of the side wall 304 makes the floor 302 recessed relative to a top edge 306 of the peripheral side wall 304 (which has a circular shape). The floor 302 has a pair of arcuate slots 310 that are formed through the floor 302 and oriented on opposite sides of the center hole 305. As shown, the pair of arcuate slots 310 are located 180 degrees apart with the center hole 305 located therebetween. Each of the slots 310 has closed ends and the arcuate lengths of the slots 310 are equal. The floor 302 also has a pair of holes 320 formed therethrough. The holes 320 are located 180 degrees apart from one another and are located between the slots 310.

The height of the side wall 114 is greater than a height of the side wall 304 and thus, when the outer ring 300 is received within the base 110, the outer ring 300 is fully contained within the recessed space of the base 110.

The outer ring 300 has a pair of pins 370 that depend downwardly from a lower face 303 of the outer ring 300. The pins 370 are located 180 degrees apart and can have different shapes, such as cylindrical. As described herein, these pins 370 are designed to controllably move the second pair of arms 220, 230.

The inner ring 350 is sized to be received within and rotate within the outer ring 300. Thus, like the outer ring 300, the inner ring 350 moves relative to the base 110 and in particular, the inner ring 350 rotates relative to the base 110. More specifically, the outer diameter of the inner ring 350 is the same or slightly less than the inner diameter of the peripheral side wall 304. The inner ring 350 has a center hole 351 that has a circular shape and has the same diameter as the diameter of the center hole 305. The thickness of the inner ring 350 is selected such that when it is received within the outer ring 300, the inner ring 350 does not protrude above the top edge of the side wall 304.

The inner ring 350 has a pair of pins 360 that depend downwardly from a lower face 353 of the inner ring 350. The pins 360 are located 180 degrees apart and can have different shapes, such as cylindrical. As described herein, these pins 360 are designed to controllably move the first pair of arms 200, 210.

Figure 5:
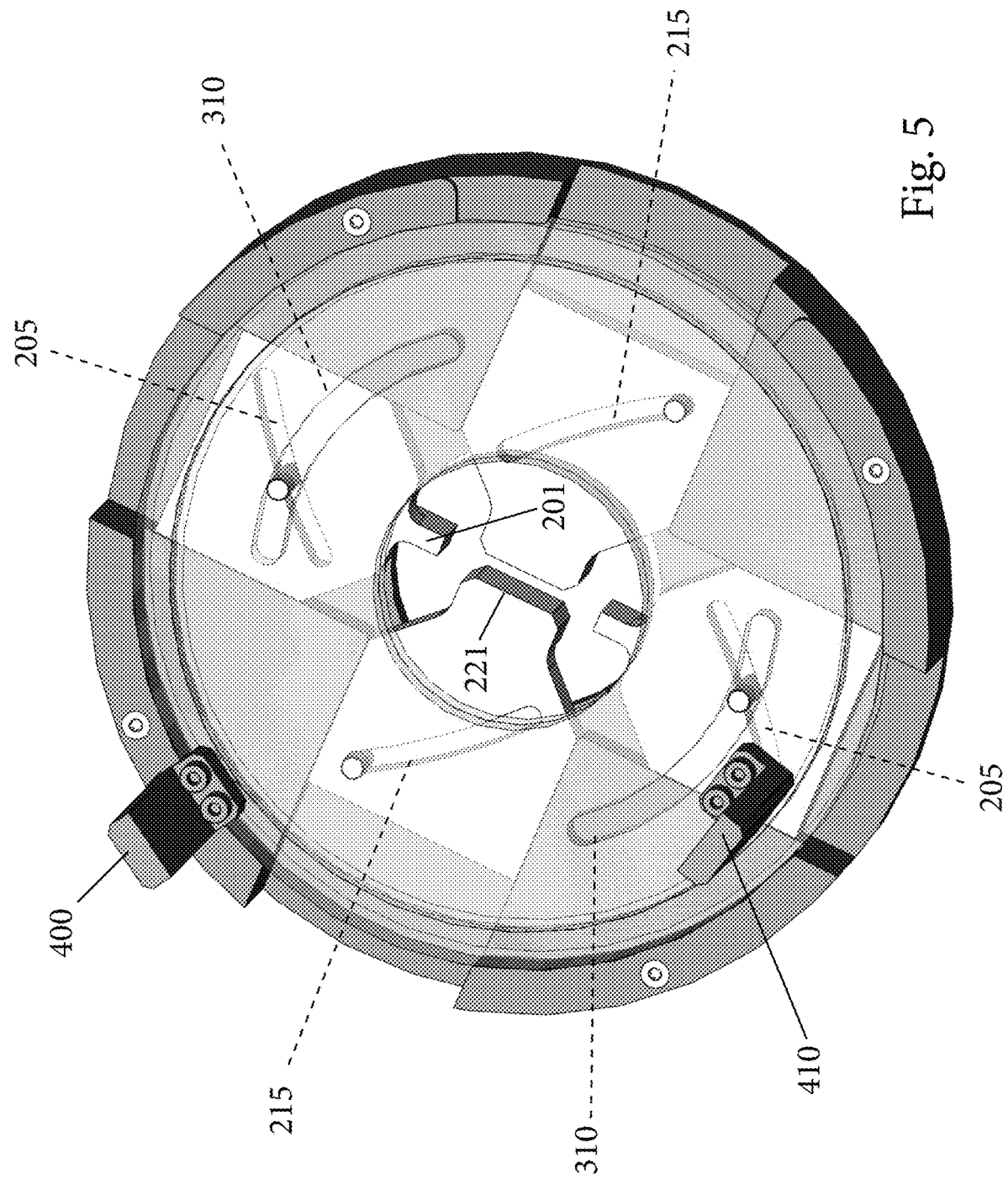
FIG. 5 is a top perspective view in partial transparency to show underlying parts of the device.
Figure 6:
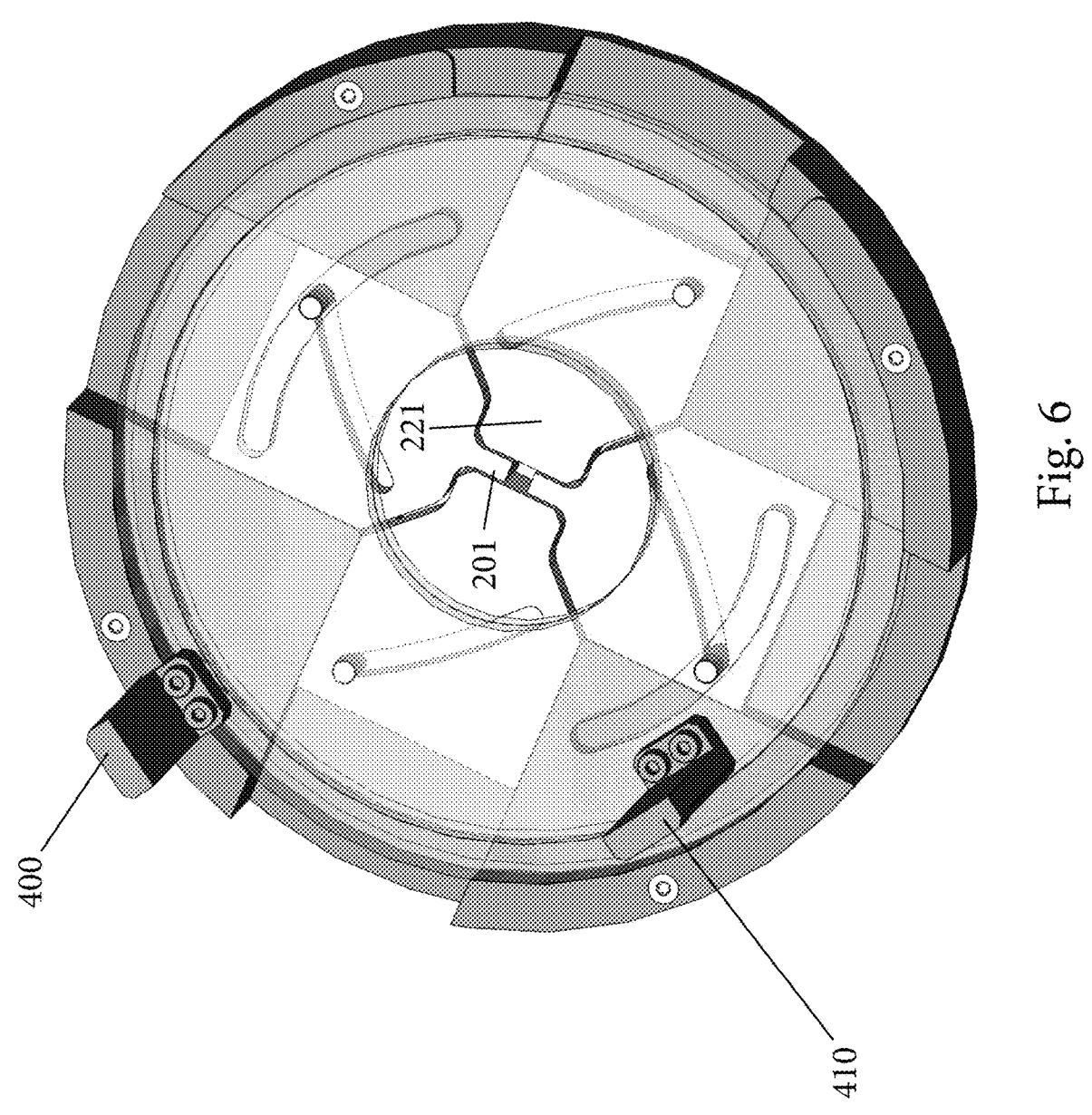
FIG. 6 is another top perspective view in partial transparency to show underlying parts of the device.

As shown in FIGS. 5 and 6, the slots 310 lie at least partially over the slots 205 to permit the pins 360 to pass through the slots 310 and into the slots 205. Pins 360 thus move, at the same time, within and long the slots 310 and slots 205.

Together with the slots 310, the pins 360 define a pin-in-groove (slot) type arrangement. More specifically, the slots 310 are guide slots that define a degree of travel of the pins 360. In other words, when each pin 360 reaches one respective end of the respective slot 310, the inner ring 350 has reached the end of rotation in a first direction (i.e., clockwise direction), while when each pin 360 reaches the other respective end of the respective slot 310, the inner ring 350 has reached the end of rotation in a second direction (i.e., counterclockwise direction).

The gemstone centering device 100 includes a cover or like 390. The cover 390 is fixedly attached to the base 110 and more particularly, the cover 390 is attached to the top edges of the sections 115, 116, 117, 118. For example, fasteners, such as screws 20, can be used to attach the cover 390 to the base 110.

The cover 390 has a center hole 391 that has the same diameter as the center holes 305, 351, with all of the holes being axially aligned.

The cover 390 is generally circular in shape and the outer diameter of the cover 390 is the same as or substantially the same as the diameter of the base 110. Then, when assembled, the peripheral edges of the cover 390 and the base 110 align. The holes in the cover 390 receive the fasteners 20 to attach the cover 390 to the base 110.

The cover 390 has a fully bounded window 392 (arcuate bounded slot) formed therein between the center hole 391 and the outer peripheral edge of the cover 390. The window 392 has an arcuate shape. The cover 390 also includes an outer cutout or notch 396. The notch 396 thus has an arcuate shape and extends along a circumferential length of the cover 390.

As mentioned earlier, the outer and inner rings 300, 350 control the movement of the arms 200, 210, 220, 230 by use of actuators. For example, a first actuator 400 and a second actuator 410 can be used to independently move (rotate) the outer ring 300 and the inner ring 350, respectively.

The first actuator 400 can be in the form of a first lever that is fixedly attached to the outer ring 300. The first actuator 400 can be L-shaped and includes a short leg 402 that is fixedly attached to the outer ring 300, while the long leg 404 extends upwardly from the top surface of the outer ring 300. The long leg 404 is thus oriented perpendicular to the top surface of the outer ring 300. In order to be accommodated and accessible, the first actuator 400 passes through the outer notch 396 and is attached to the top edge of the side wall 304 of the outer ring 300. In the assembled state, the first actuator 400 is located within the outer notch 396 and the arcuate length of the outer notch 396 defines the degree of travel of the first actuator 400. In other words, when the first actuator 400 contacts one end of the outer notch 396, the outer ring 300 is rotated to one maximum angular position and similarly, when the first actuator 400 contacts the other end of the outer notch 396, the outer ring

300 is rotated to the other maximum angular position. The first actuator 400 thus provides a means by which the user can rotate, with precision, the outer ring 300 which in turn controls, with precision, the movement of the second pair of arms 220, 230.

The second actuator 410 can be in the form of a first lever that is fixedly attached to the top surface of the inner ring 310. The second actuator 410 can be L-shaped and includes a short leg 412 that is fixedly attached to the inner ring 310, while the long leg 414 extends upwardly from the top surface of the inner ring 310. The long leg 414 is thus oriented perpendicular to the top surface of the inner ring 310. In order to be accommodated and accessible, the second actuator 410 passes through the window 392 and is attached to the top surface of the inner ring 310. In the assembled state, the second actuator 410 is located within the window 392 and the arcuate length of the window 392 defines the degree of travel of the second actuator 410. In other words, when the second actuator 410 contacts one end of the window 392, the inner ring 310 is rotated to one maximum angular position and similarly, when the second actuator 410 contacts the other end of the window 392, the inner ring 310 is rotated to the other maximum angular position. The second actuator 410 thus provides a means by which the user can rotate, with precision, the inner ring 310 which in turn controls, with precision, the movement of the first pair of arms 200, 210.

The coupling between the first actuator 400 and the outer ring 300 and the second pair of arms 220, 230 is as follows. As mentioned, the design of the second pair of arms 220, 230 and the guide tracks 240 is such that the arms 220, 230 can only move axially within the guide tracks 240 in an in and out direction (toward and away from the center opening 111 of the base 110. The pair of pins 370 of the outer ring 300 are received within the second slots 215 of the arms 220, 230 and the construction of the second slots 215 is such that the rotation of the outer ring 300 in a first direction is translated into axial movement of the arms 220, 230 in a first direction and the rotation of the outer ring 300 in an opposite second direction is translated into axial movement of the arms 220, 230 in an opposite second axial direction. The precise relative locations of the pins 370 in the second slots 215 is described in more detail below.

The coupling between the second actuator 410 and the inner ring 310 and the first pair of arms 200, 210 is as follows. As mentioned, the design of the first pair of arms 200, 210 and the guide tracks 240 is such that the arms 200, 210 can only move axially within the guide tracks 240 in an in and out direction (toward and away from the center opening 111 of the base 110. The pair of pins 360 of the inner ring 310 are received within the first slots 205 of the arms 200, 210 and the construction of the first slots 205 is such that the rotation of the inner ring 310 in a first direction is translated into axial movement of the arms 200, 210 in a first direction and the rotation of the inner ring 310 in an opposite second direction is translated into axial movement of the arms 200, 210 in an opposite second axial direction. The precise relative locations of the pins 360 in the first slots 205 is described in more detail below.

Operation of the Gemstone Centering Device

FIGS. 16-37 illustrate different shaped gemstones. More specifically, three of the more popular shapes are shown in that FIGS. 16-21 illustrates an oblong shape gemstone 1 that is commonly referred to as a marquis cut; FIGS. 22-26 illustrate a large round shaped gemstone 2; FIGS. 27-31 illustrate a smaller round shaped gemstone 3; and FIGS. 32-37 illustrate a rectangular shaped gemstone 4 commonly referred to as a baguette cut. As seen in the figures, one of the advantages of the gemstone centering device 100 is that the device can center many different shaped gemstones, including but not limited, to those shown in the drawings (i.e., gemstones 1, 2, 3, 4).

For the present discussion, a non-round gemstone can be characterized as having a long axis and a short axis.

The first step in centering a gemstone is to place the gemstone on the (glass) platform 10. The user can attempt to center the gemstone as best possible by a manual placement of the gemstone on the platform 10 and then allow the operation of the gemstone centering device 100 to ensure precise centering of the gemstone on the platform 10. For non-round shaped gemstones, the gemstone should be placed on the platform 10 such that the long axis of the gemstone is aligned with the pair of first arms 200, 210 and the short axis is aligned with the pair of second arms 220, 230.

A first centering operation is performed by moving the first actuator 400 in the first direction (e.g., clockwise direction) within the outer notch. This movement of the first actuator 400 causes the pins 370 to move within the second slots 215 of the arms 220, 230, thereby driving the arms 220, 230 in the first direction which is the direction in which the arms 220, 230 are driven toward one another (which results in a progressive reduction in the second space (S2)). Depending upon the size of the gemstone, at some point during the movement of the first actuator 400, the first gem contacting surfaces (ends of the second protrusions 221) contact the gemstone. If the gemstone is off-centered, the continued movement of the arms 220, 230 toward one another causes an aligning movement of the gemstone resulting in centering along the first axis. When the gemstone is in intimate contact with both of the first gem contacting surfaces along opposing surfaces of the stone, the gemstone has been centered along the first axis. FIGS. 16-19 show this movement of the first actuator 400. Once the gemstone is squarely between the first gem contacting surfaces, the first actuator 400 cannot freely move in a direction that causes the movement of the arms 220, 230 toward the fully extended position.

Figure 7:
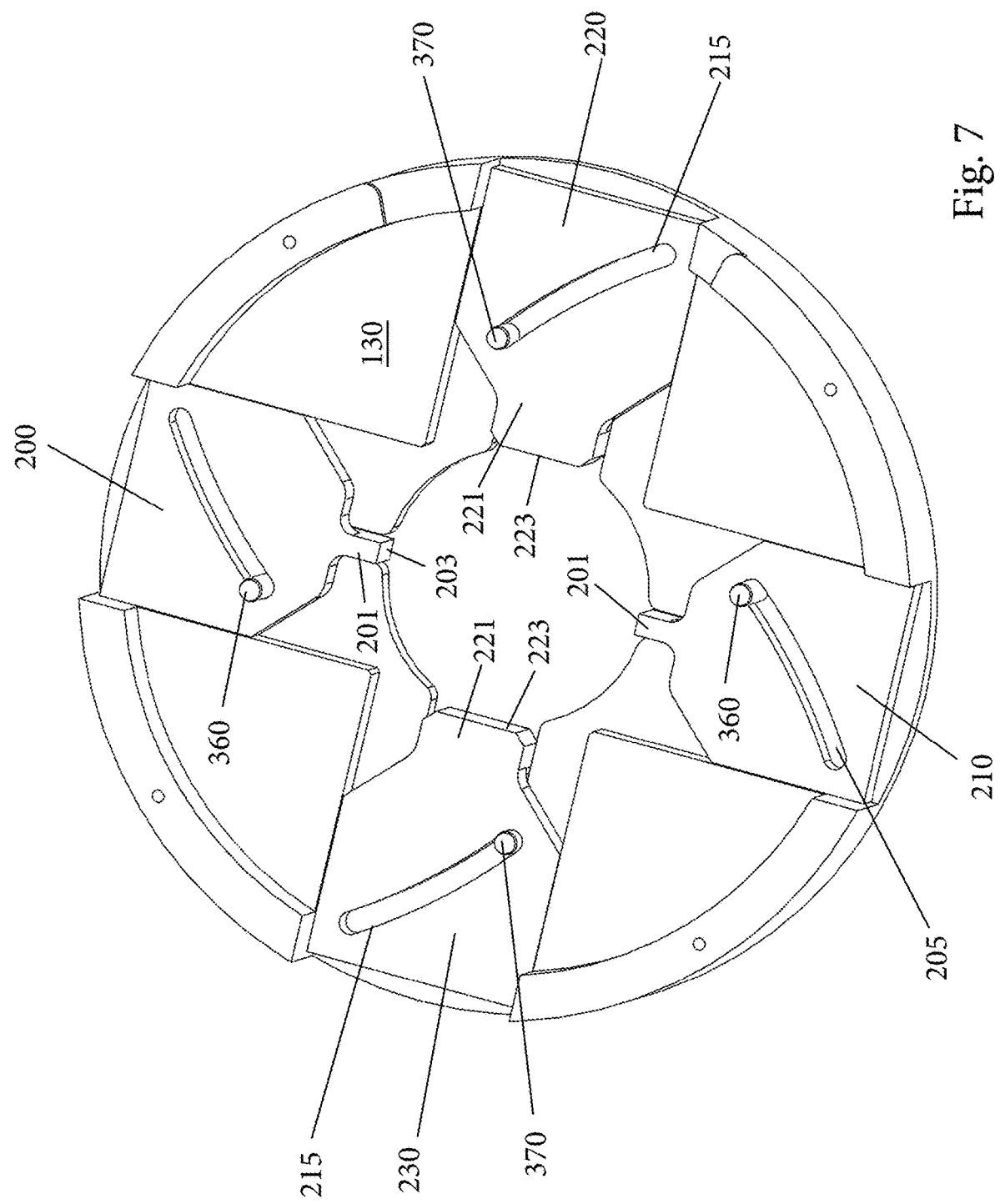
FIG. 7 is a top perspective view showing a plurality of movable arms arranged on a base and being shown in a first position.
Figure 8:
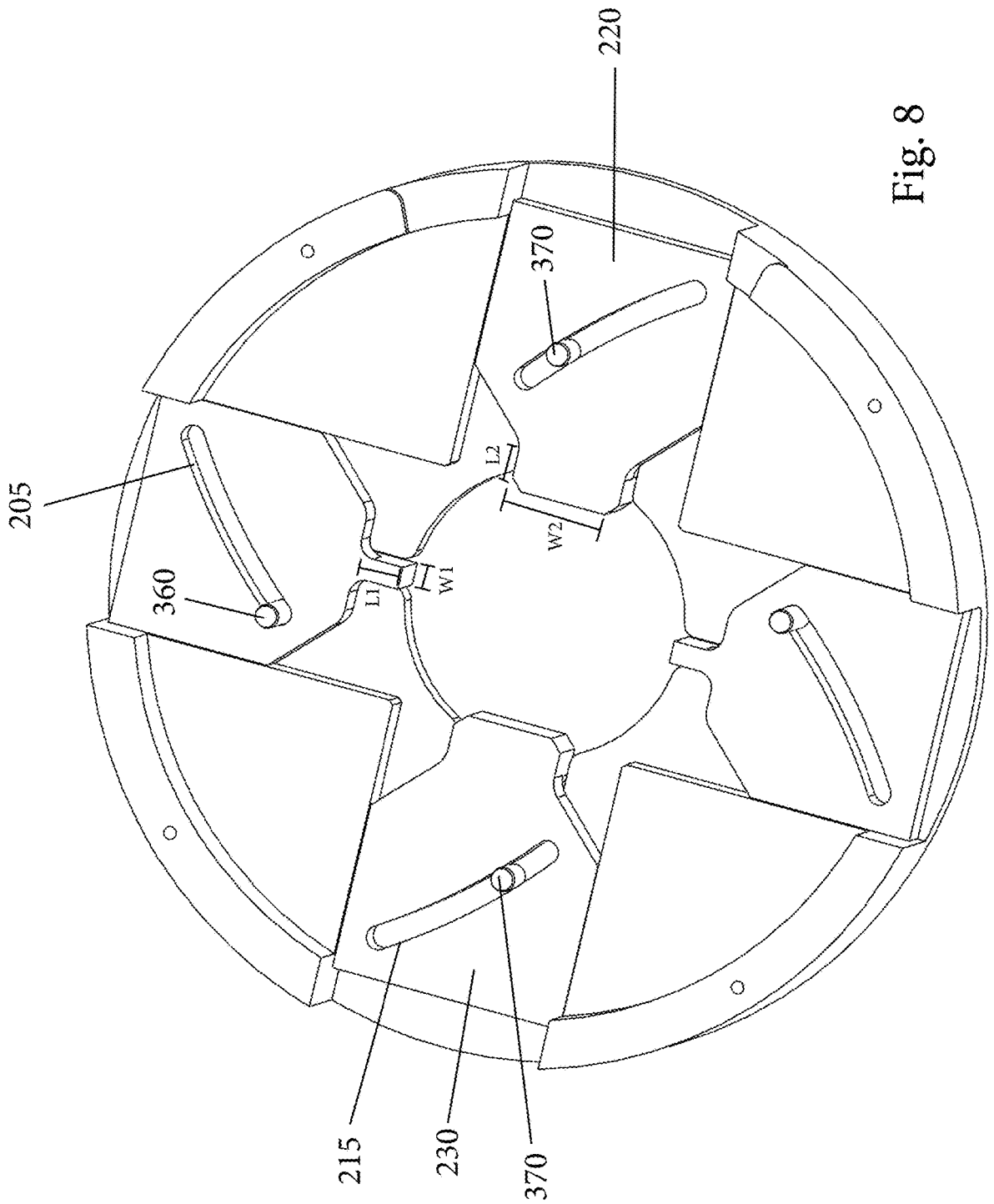
FIG. 8 is a top perspective view showing a plurality of movable arms arranged on a base and being shown in a second position.
Figure 9:
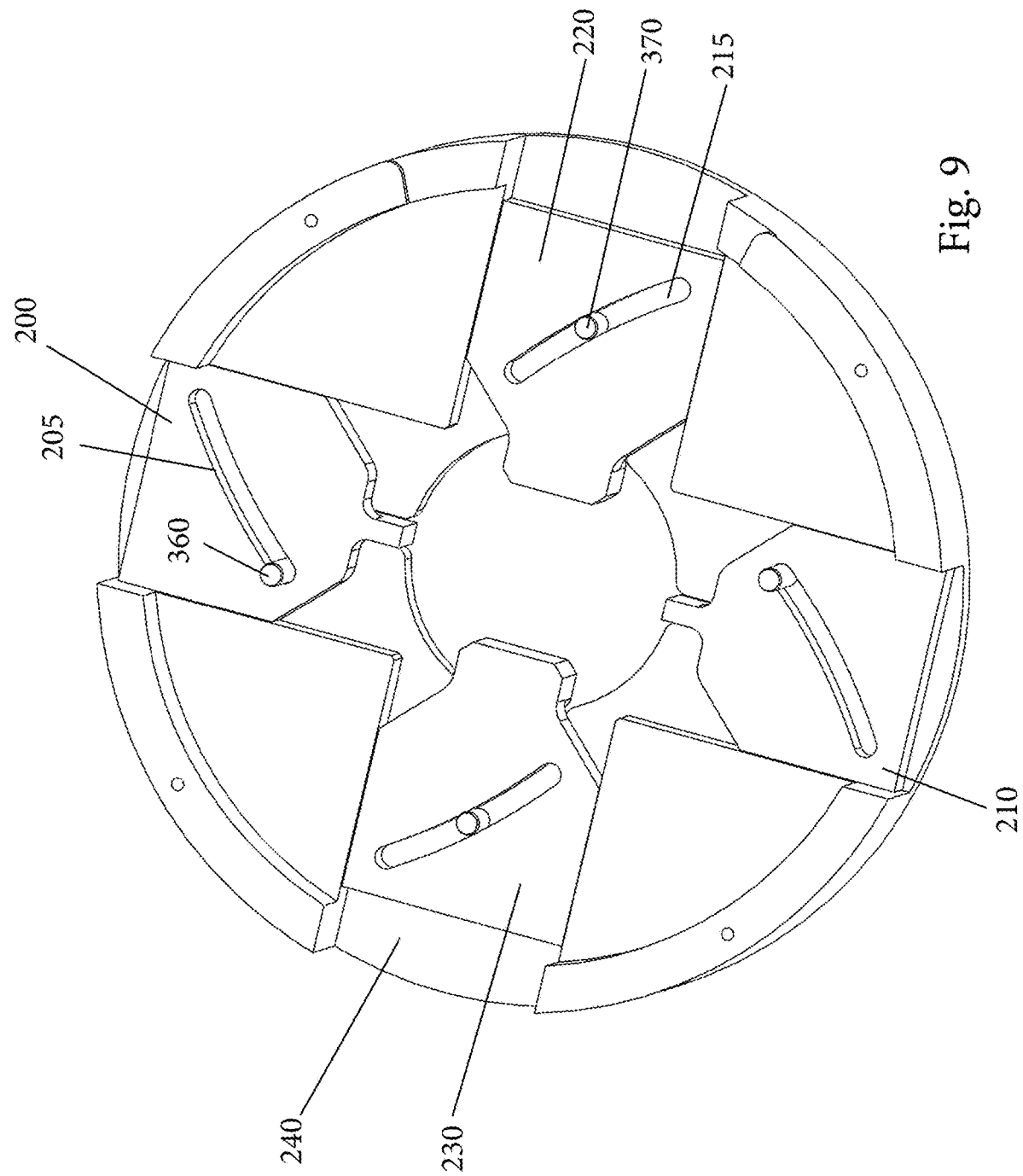
FIG. 9 is a top perspective view showing a plurality of movable arms arranged on a base and being shown in a third position.
Figure 10:
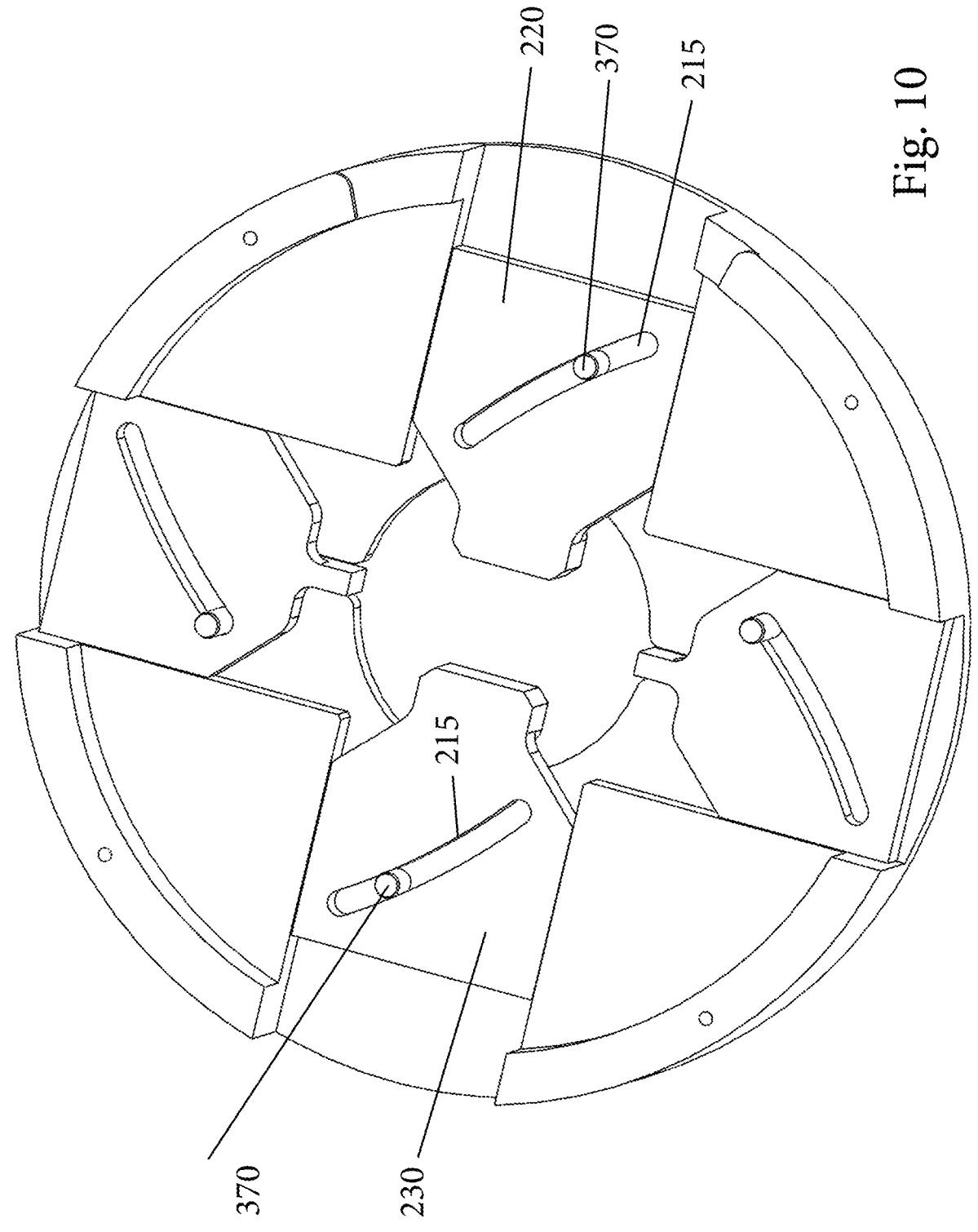
FIG. 10 is a top perspective view showing a plurality of movable arms arranged on a base and being shown in a fourth position.

FIGS. 7-11 also show the movement of the pins 370 within the slots 215 as part of the first centering operation. In particular, FIG. 7 shows pins 370 in the initial positions at one end of the slots 215 with the arms 220, 230 fully retracted and FIG. 11 shows the pins 370 in end positions at the opposite ends of the slots 215 with the arms 220, 230 fully extended.

Figure 20:
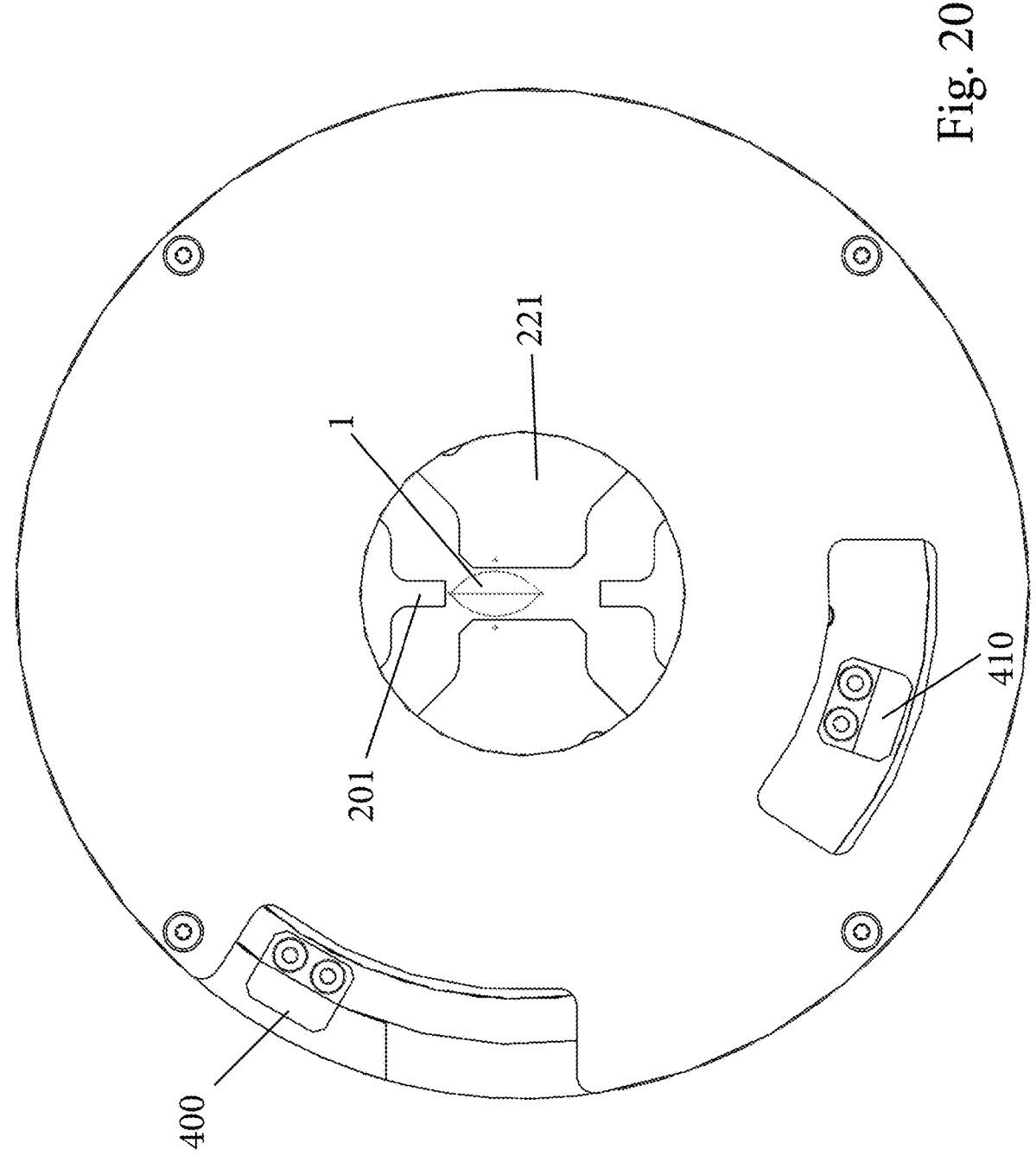
FIG. 20 is a top perspective view showing a fourth step in centering the first gemstone.
Figure 21:
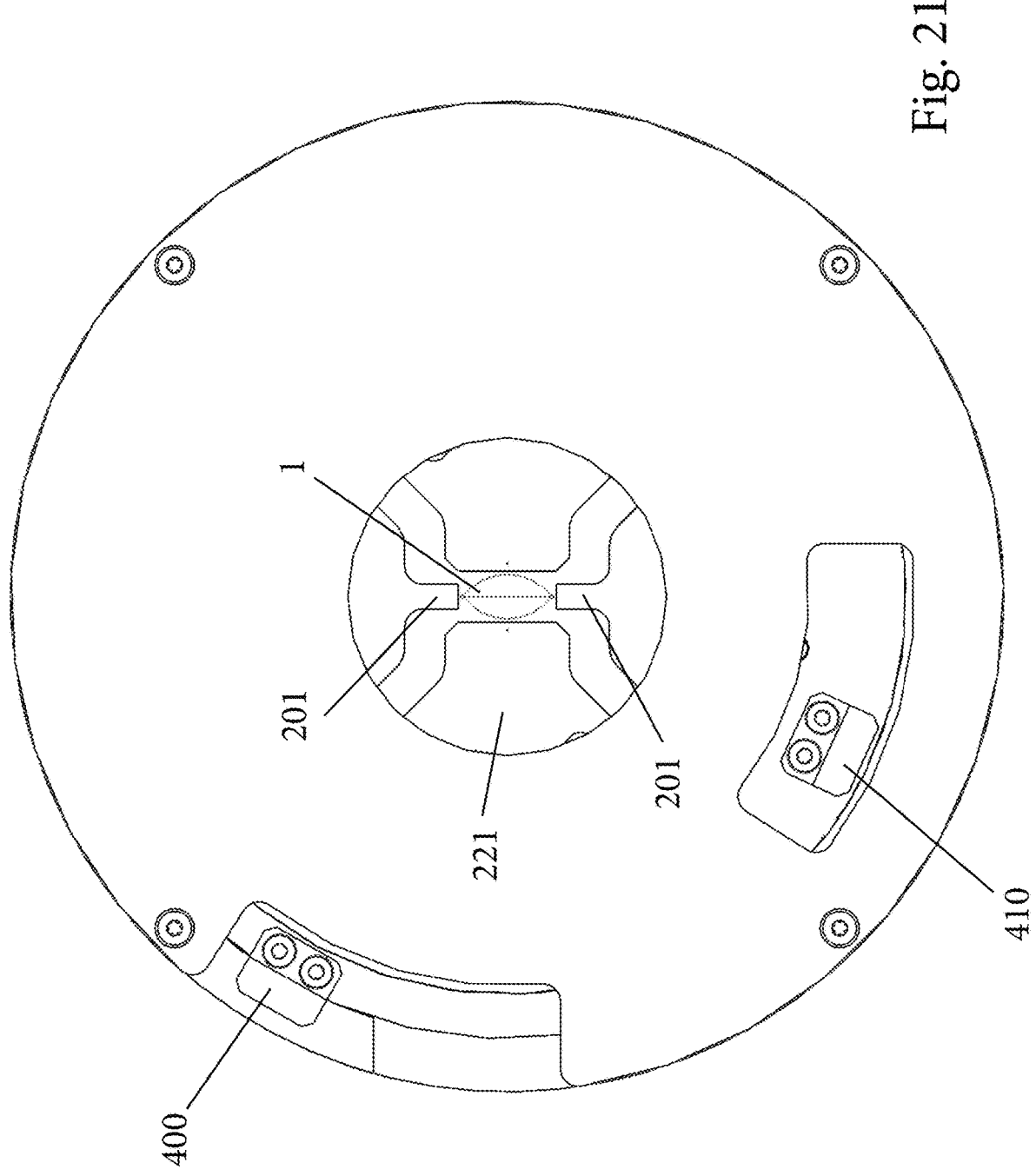
FIG. 21 is a top perspective view showing a fifth step in centering the first gemstone.
Figure 22:
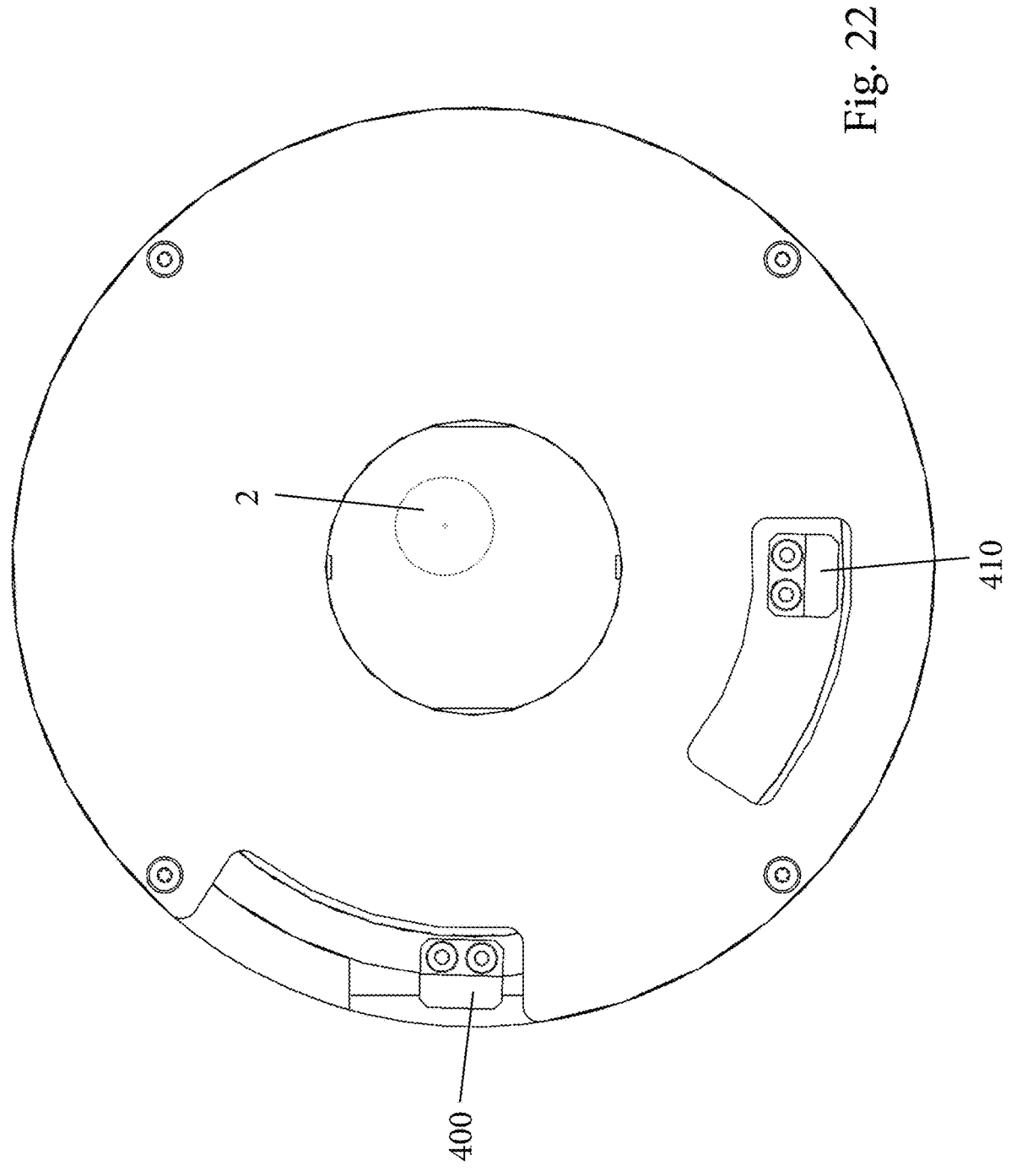
FIG. 22 is a top perspective view showing a second gemstone in an initial position prior to centering.
Figure 23:
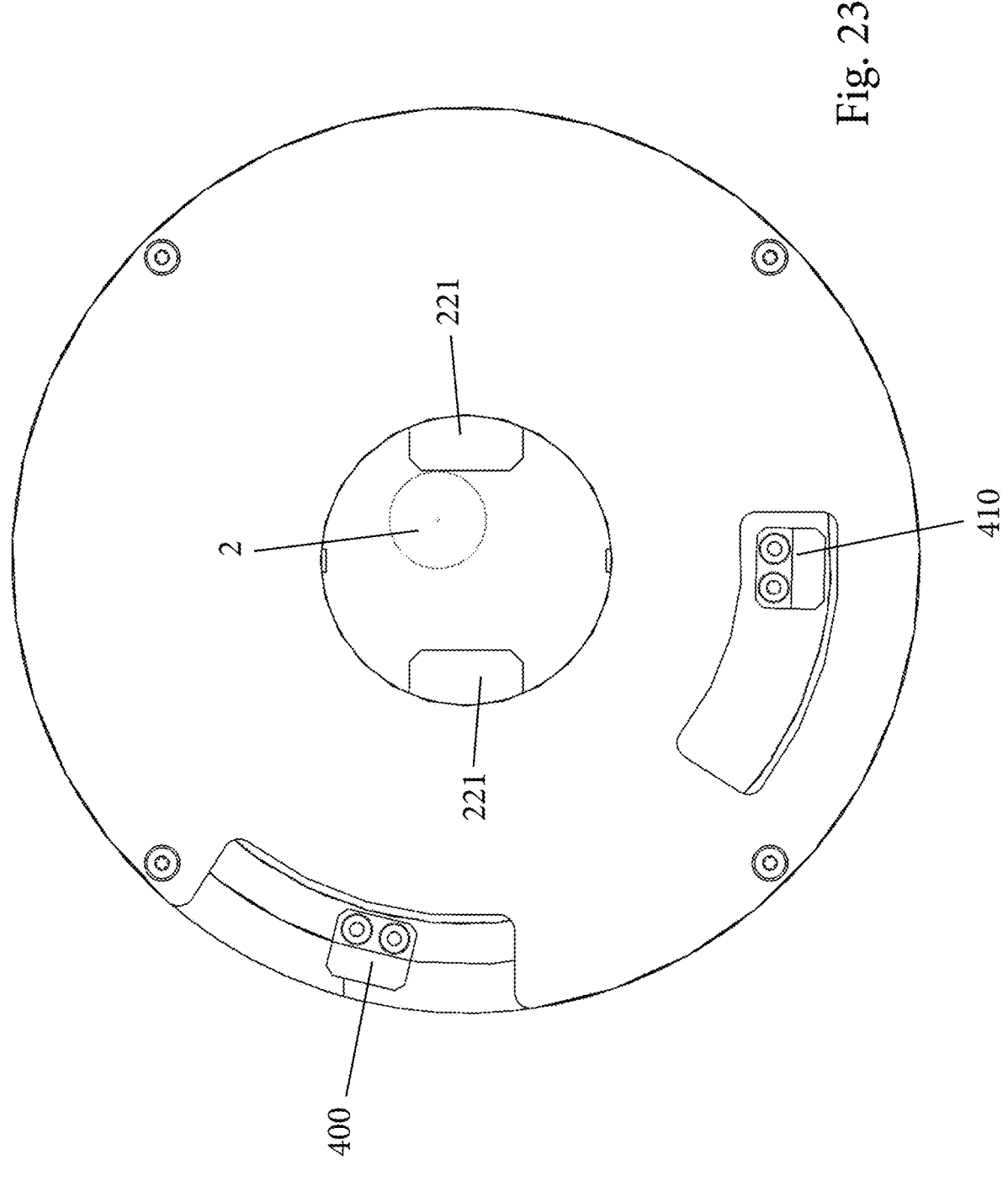
FIG. 23 is a top perspective view showing a first step in centering the second gemstone.
Figure 24:
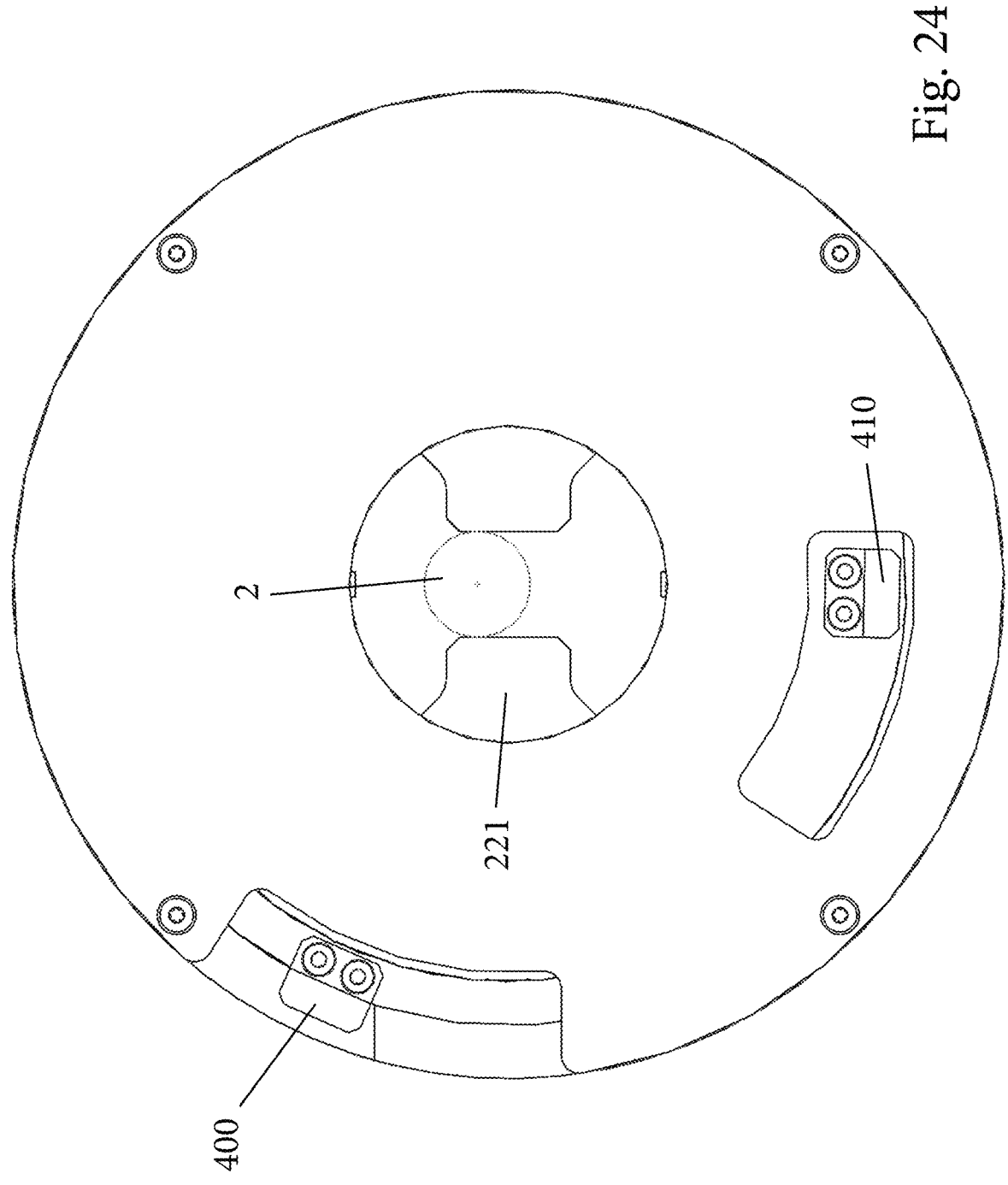
FIG. 24 is a top perspective view showing a second step in centering the second gemstone.
Figure 25:
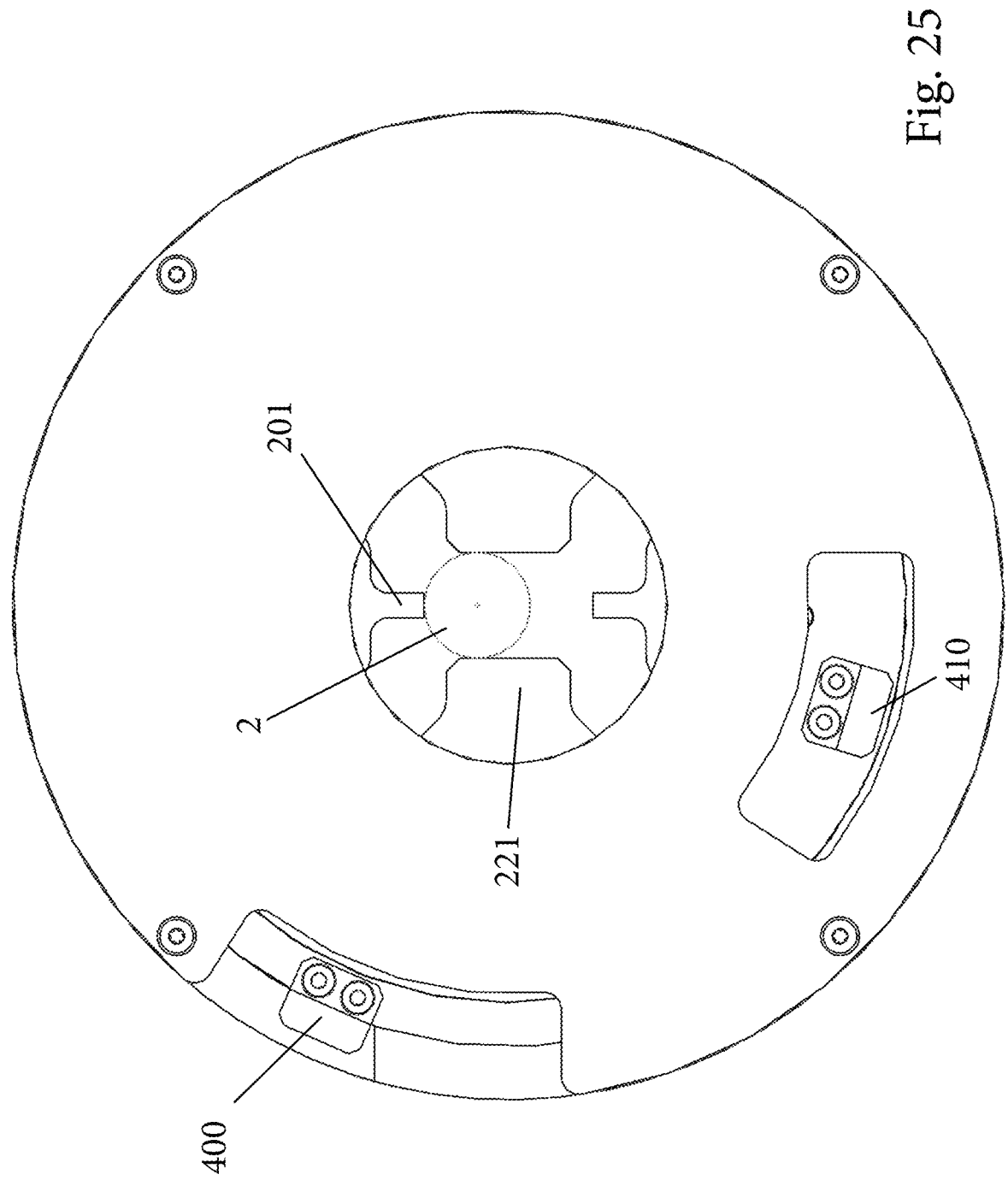
FIG. 25 is a top perspective view showing a third step in centering the second gemstone.
Figure 26:
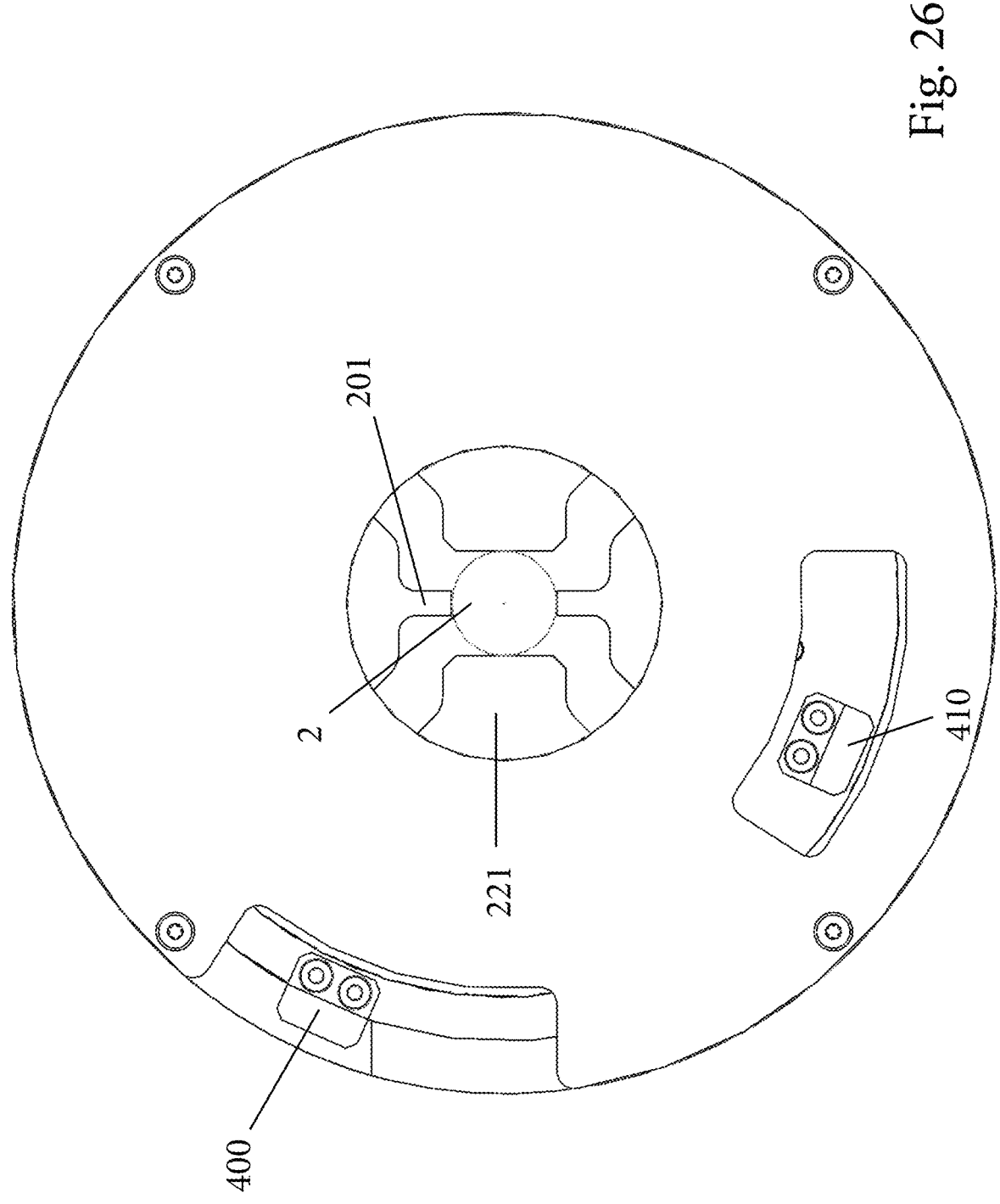
FIG. 26 is a top perspective view showing a fourth step in centering the second gemstone.
Figure 27:
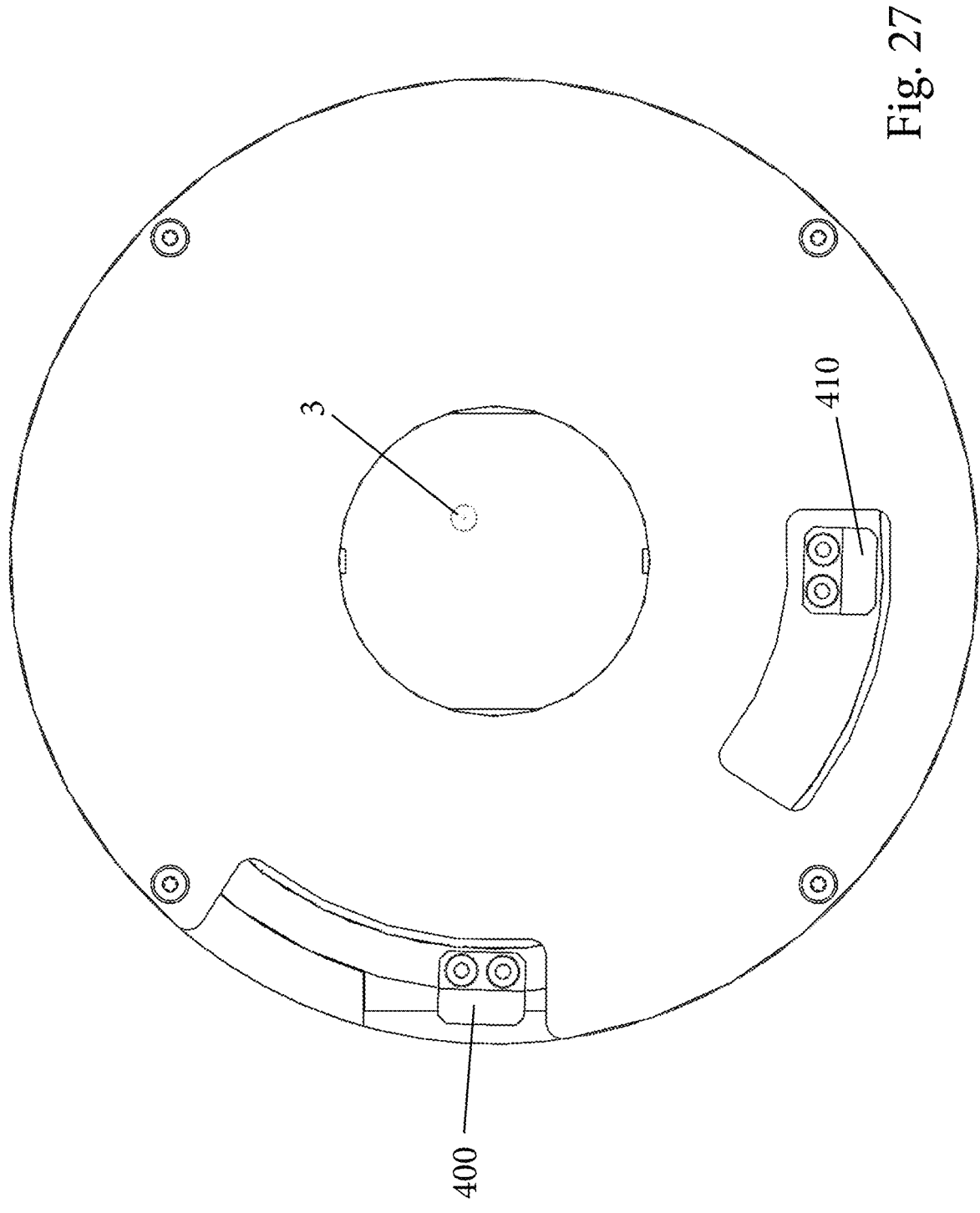
FIG. 27 is a top perspective view showing a third gemstone in an initial position prior to centering.
Figure 28:
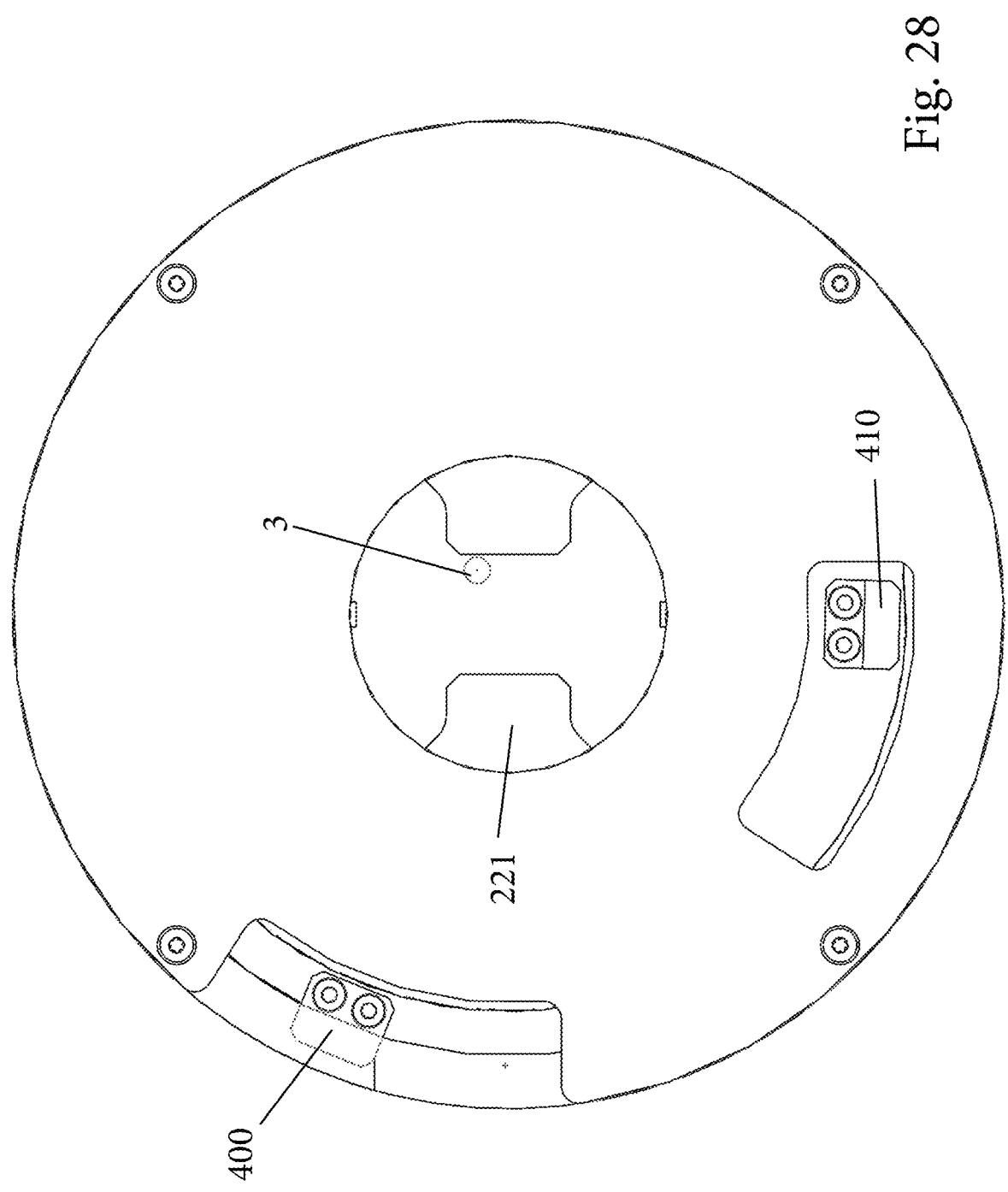
FIG. 28 is a top perspective view showing a first step in centering the third gemstone.
Figure 29:
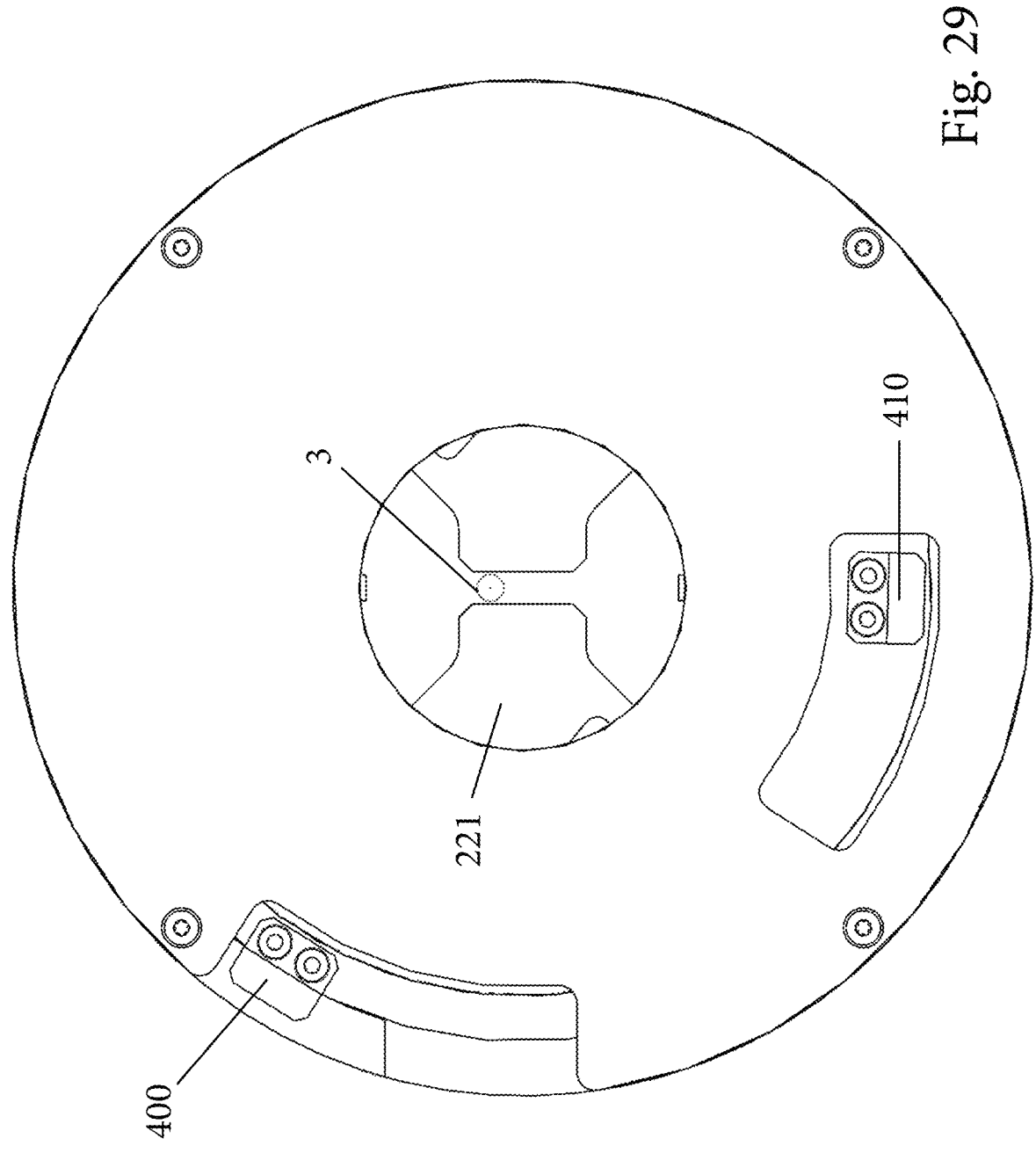
FIG. 29 is a top perspective view showing a second step in centering the third gemstone.
Figure 30:
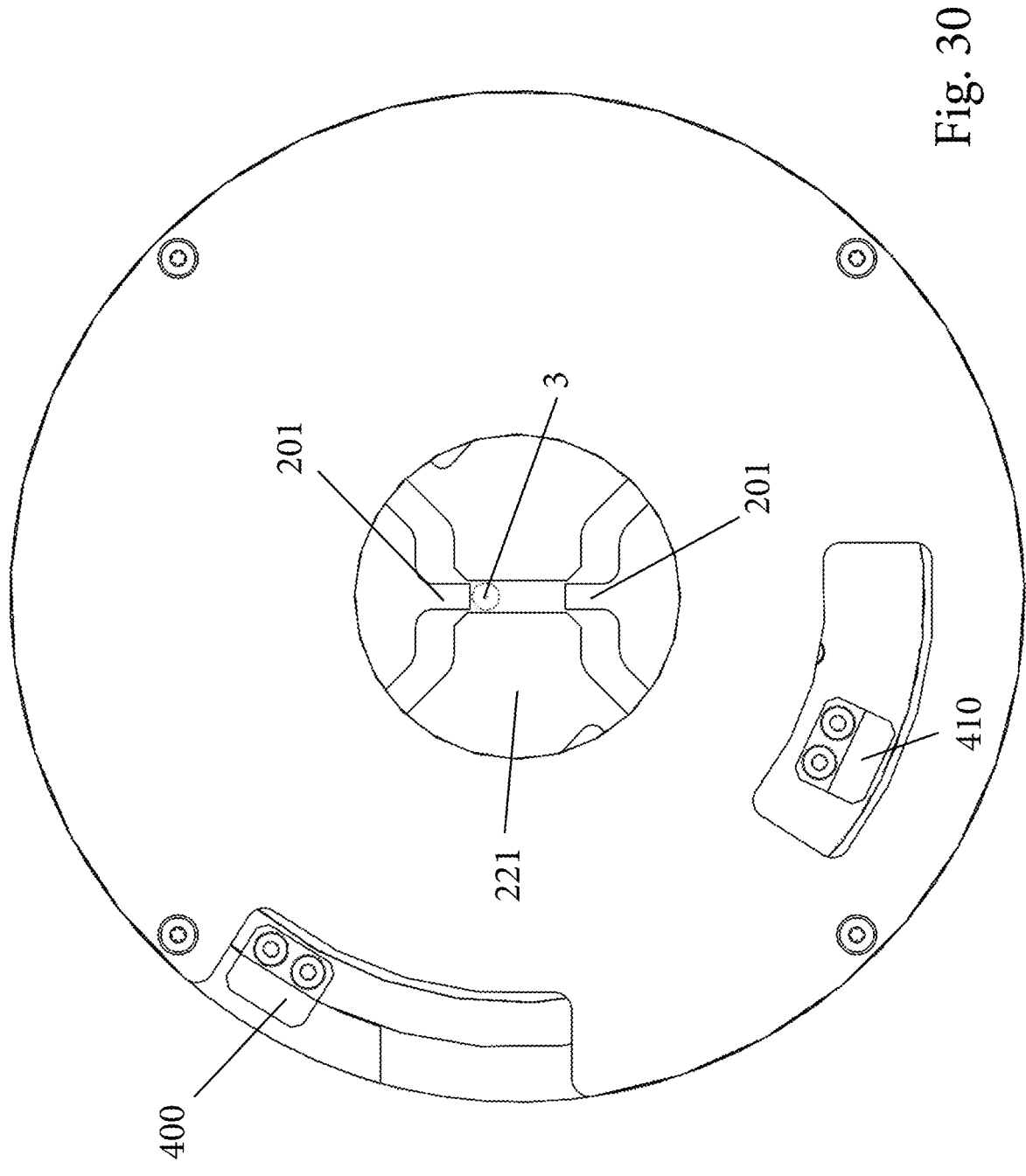
FIG. 30 is a top perspective view showing a third step in centering the third gemstone.
Figure 31:
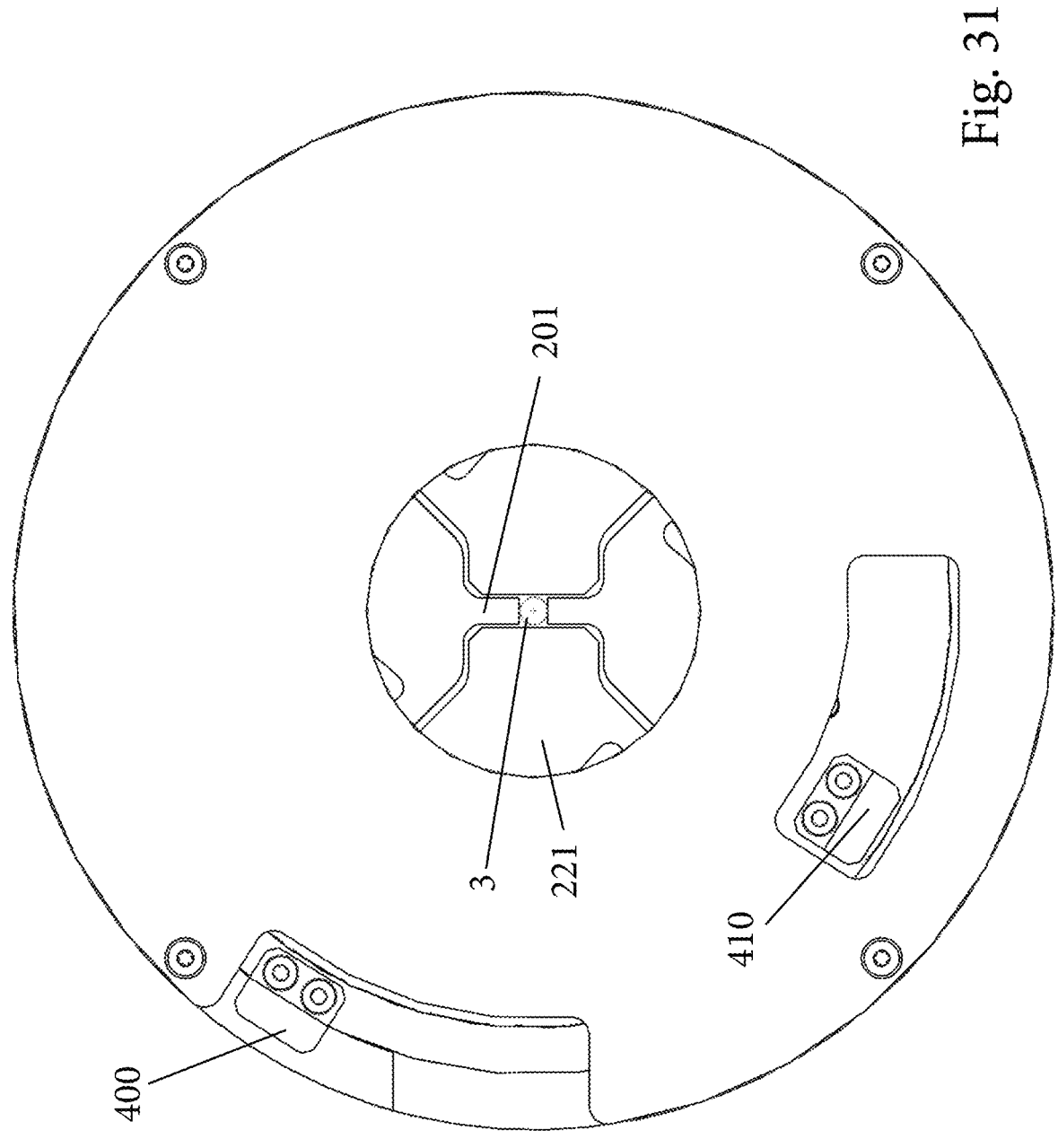
FIG. 31 is a top perspective view showing a fourth step in centering the third gemstone.
Figure 32:
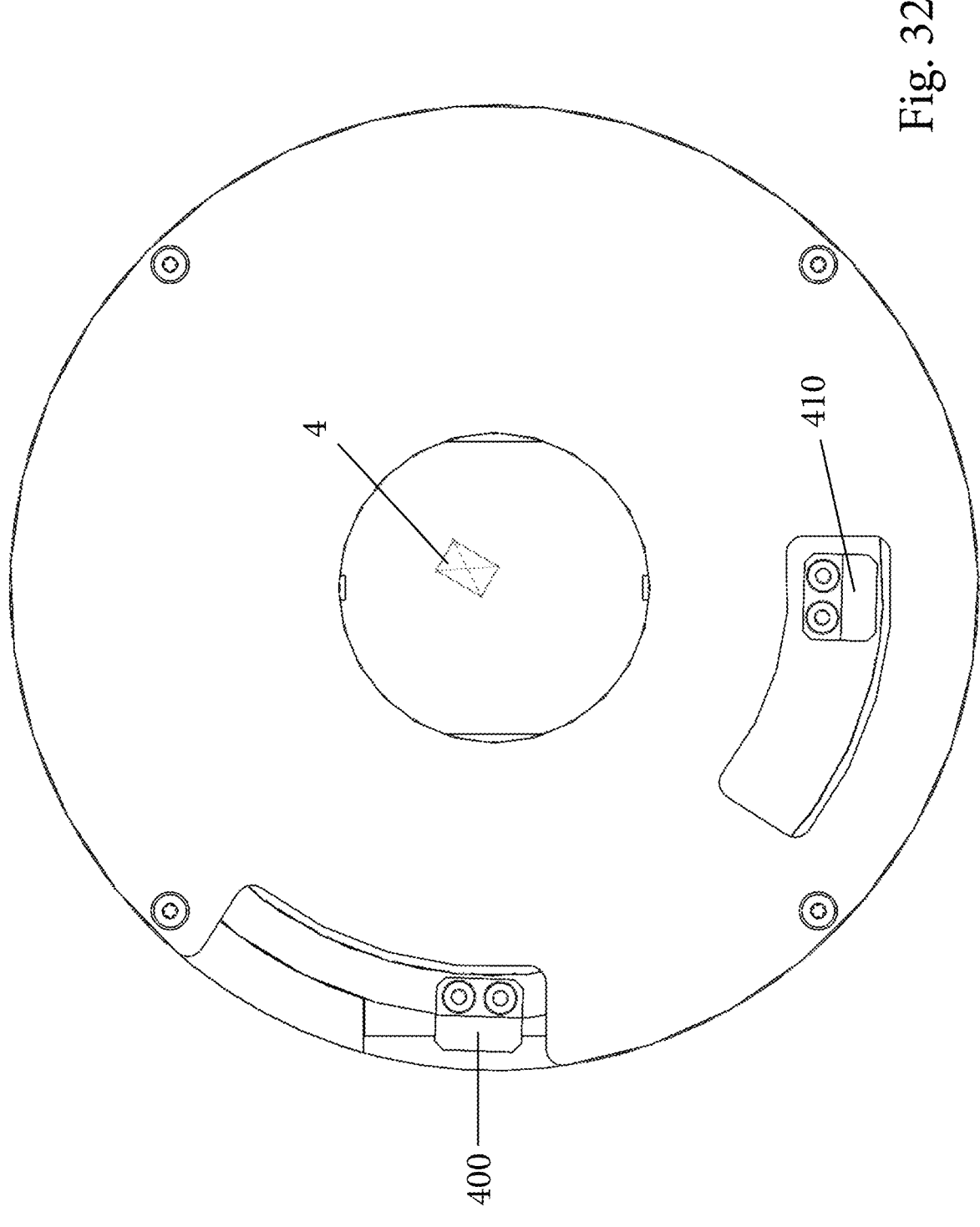
FIG. 32 is a top perspective view showing a fourth gemstone in an initial position prior to centering.
Figure 33:
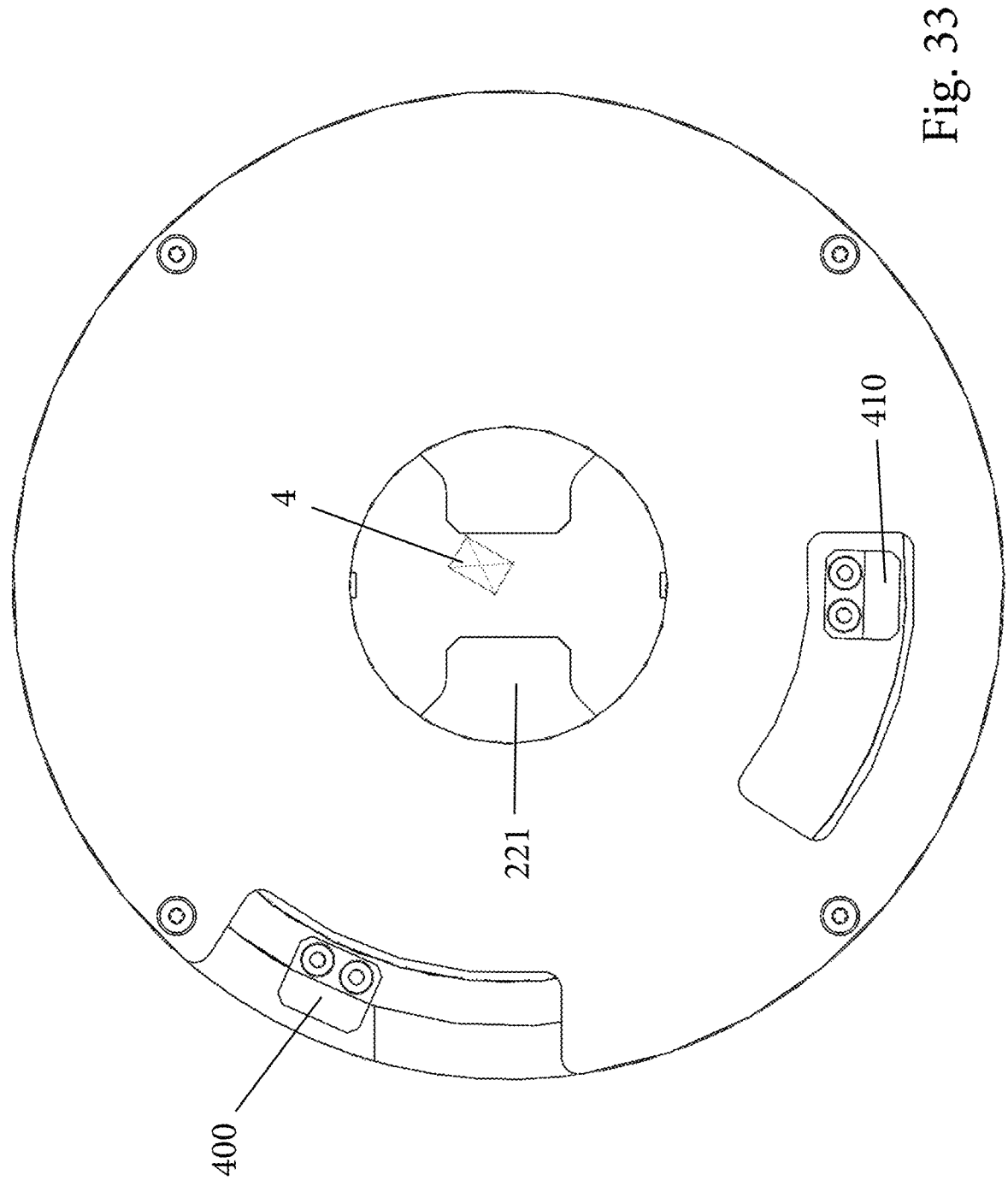
FIG. 33 is a top perspective view showing a first step in centering the fourth gemstone.
Figure 34:
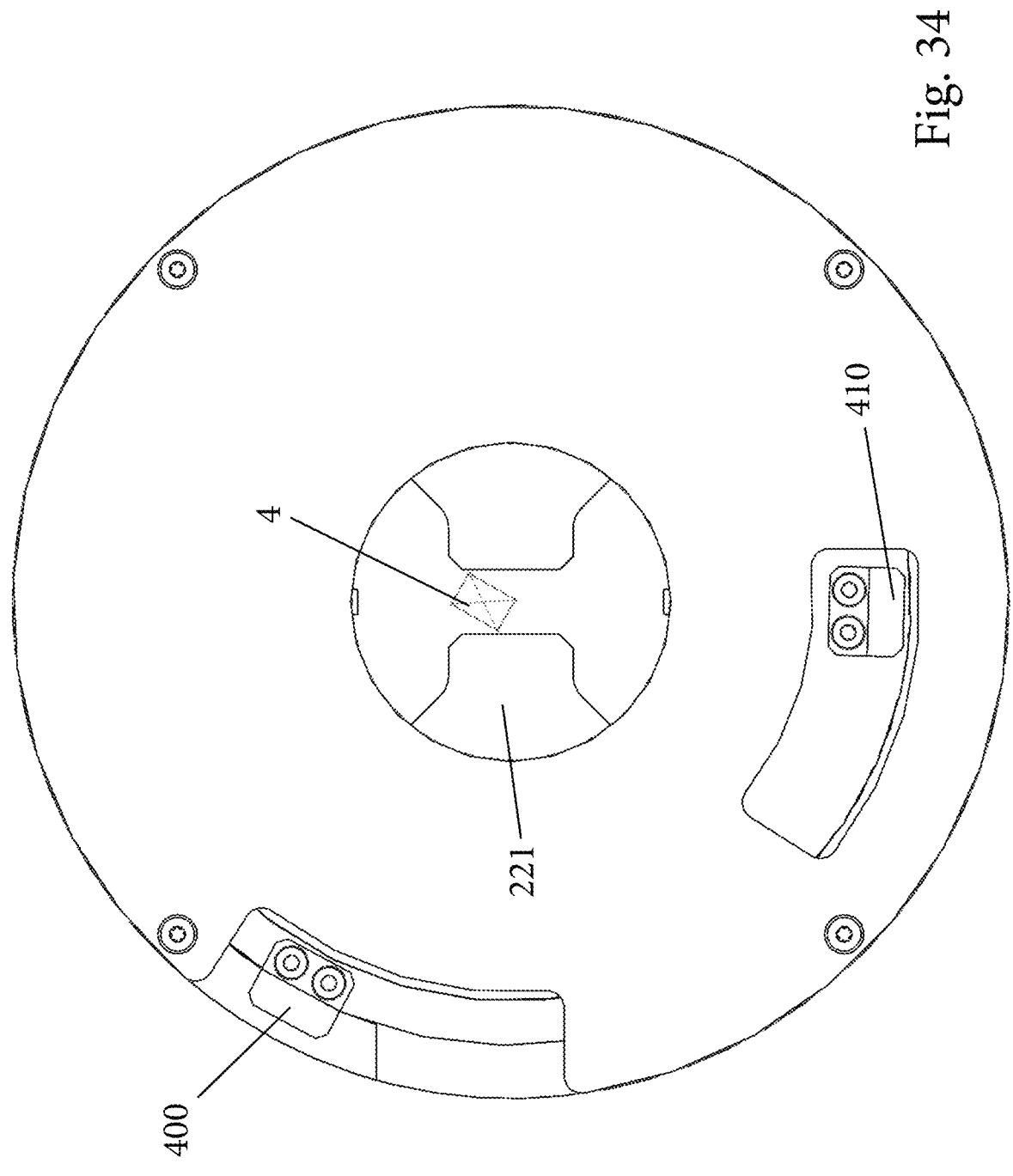
FIG. 34 is a top perspective view showing a second step in centering the fourth gemstone.
Figure 35:
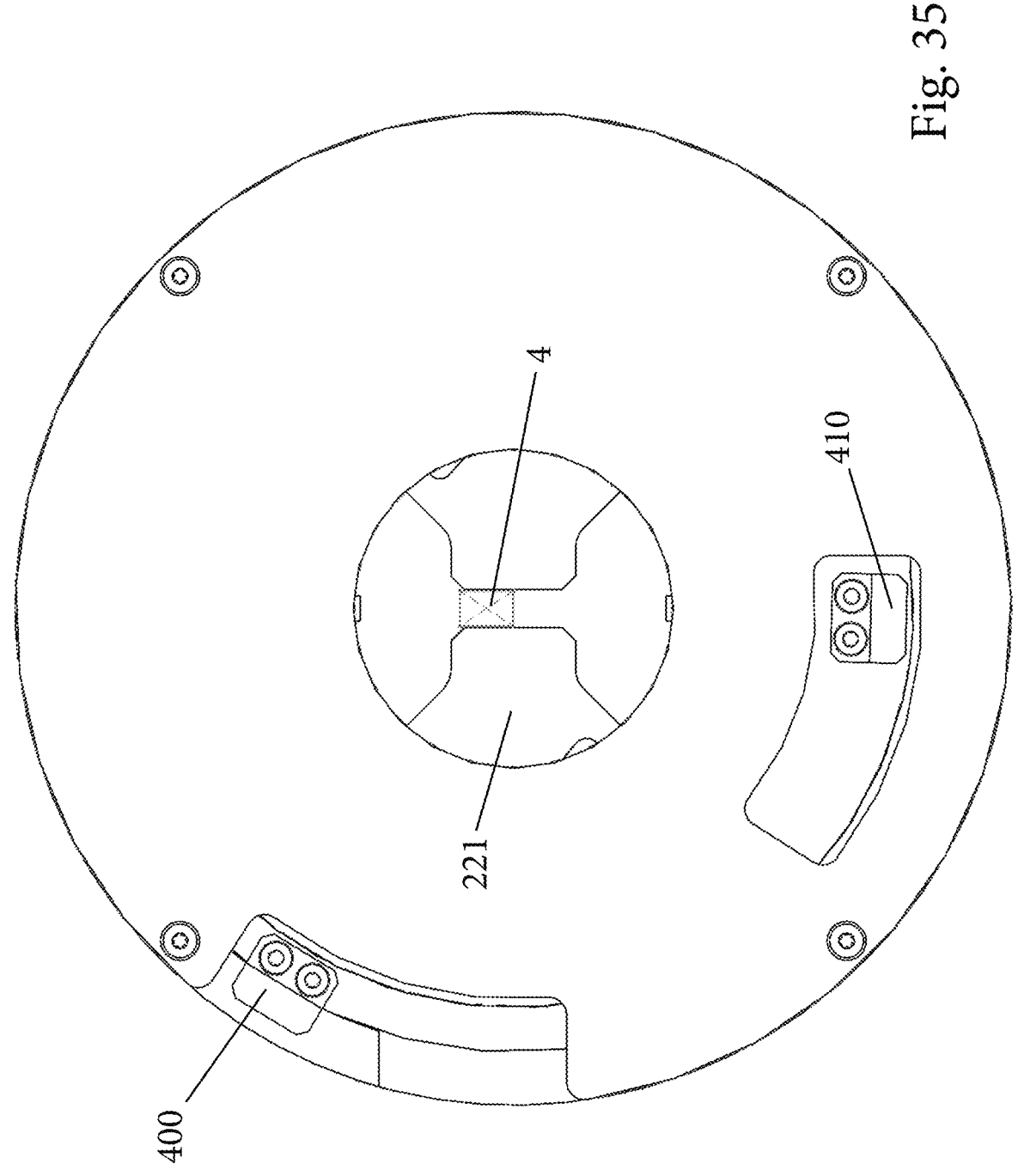
FIG. 35 is a top perspective view showing a third step in centering the fourth gemstone.
Figure 36:
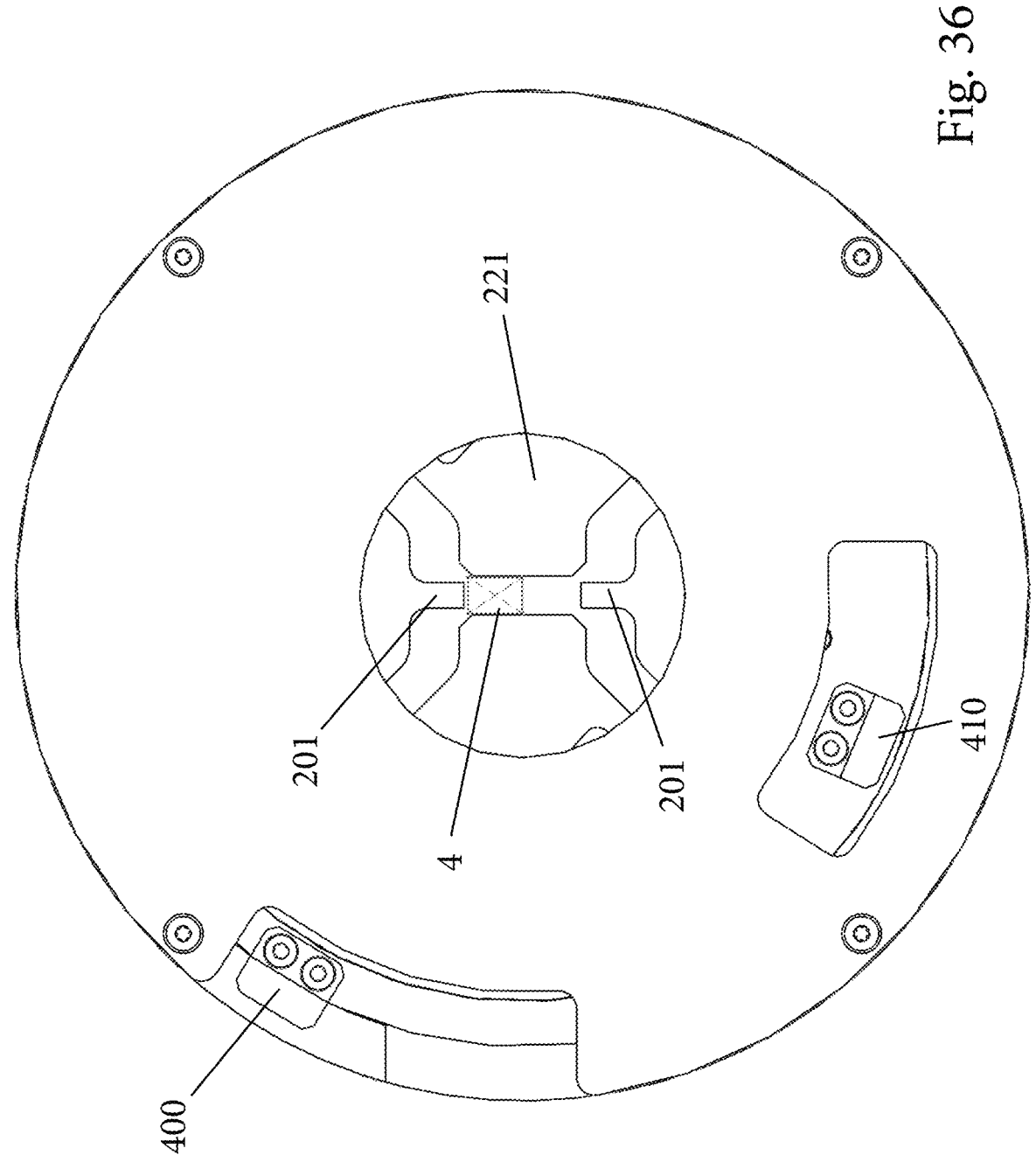
FIG. 36 is a top perspective view showing a fourth step in centering the fourth gemstone.
Figure 37:
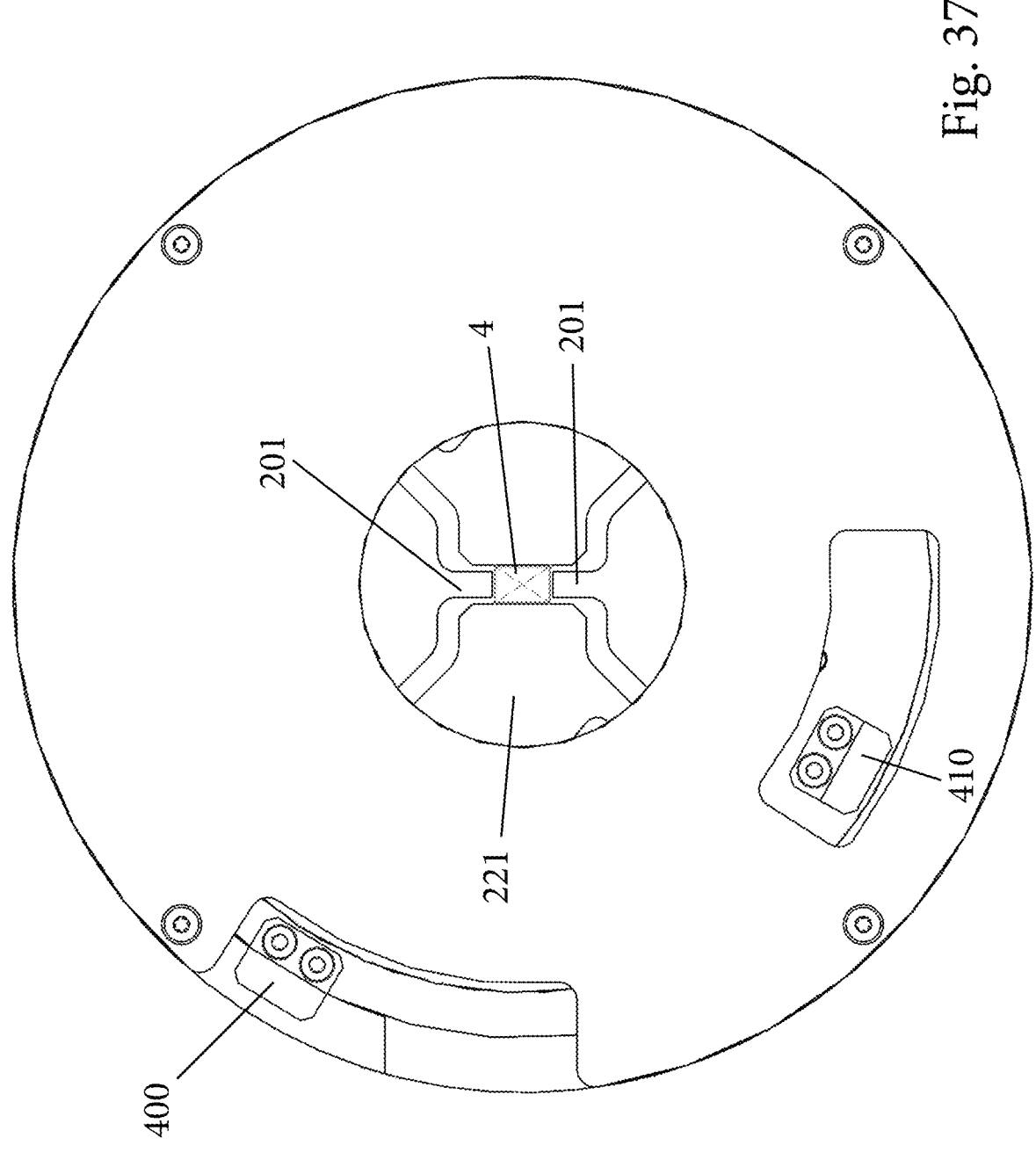
FIG. 37 is a top perspective view showing a fifth step in centering the fourth gemstone.

Once the first centering operation is performed, the user then performs a second centering operation is performed by moving the second actuator 410 in the first direction (e.g., clockwise direction) within the outer notch. This movement of the second actuator 410 causes the pins 360 to move within the first slots 205 of the arms 200, 210, thereby driving the arms 200, 210 in the first direction which is the direction in which the arms 200, 210 are driven toward one another (which results in a progressive reduction in the first space (S1)). Depending upon the size of the gemstone, at some point during the movement of the second actuator 410, the second gem contacting surfaces (ends of the first protrusions 201) contact the gemstone. The gemstone has already been centered along the first axis and thus, the continued movement of the arms 200, 210 toward one another causes an aligning movement of the gemstone resulting in centering along the second axis (which is perpendicular to the first axis). When the gemstone is in intimate contact with both of the second gem contacting surface, the gemstone has been centered along the second axis. FIGS. 20-21 show this movement of the second actuator 410. Once the gemstone is squarely between the second gem contacting surfaces, the second actuator 410 cannot freely move in a direction that causes the movement of the arms 200, 210 toward the fully extended position.

As mentioned, the first protrusions 201 are moved into the second space (S2) between the first gem contacting surfaces and continue to move toward one another and into contact with the gemstone. For oblong or rectangular shaped gemstones, the first protrusions 201 contact opposing pointed ends of the gemstone. Since the pair of first protrusions 201 move together in unison, the gemstone is moved and centered along this second axis.

Figure 12:
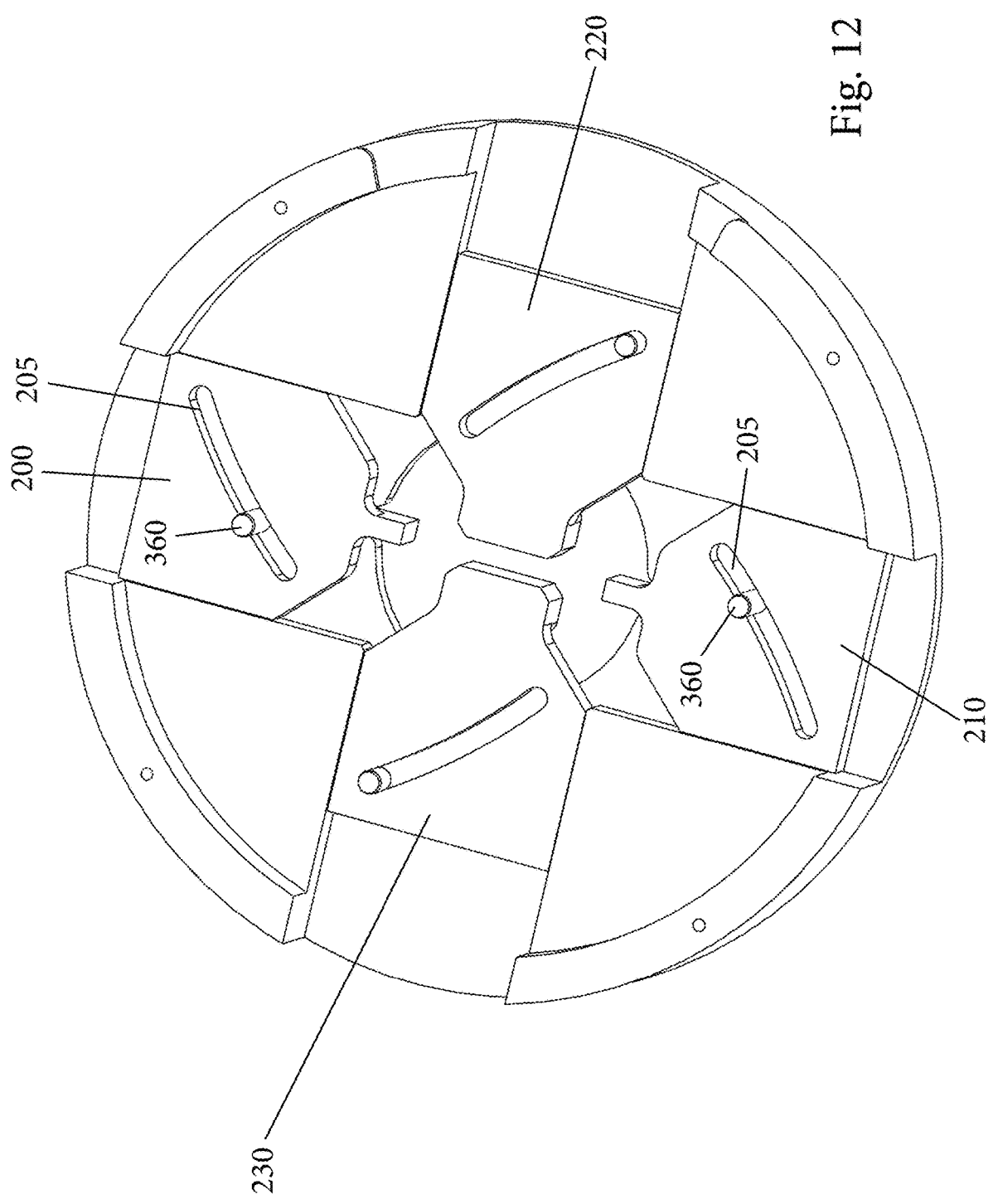
FIG. 12 is a top perspective view showing a plurality of movable arms arranged on a base and being shown in a sixth position.
Figure 13:
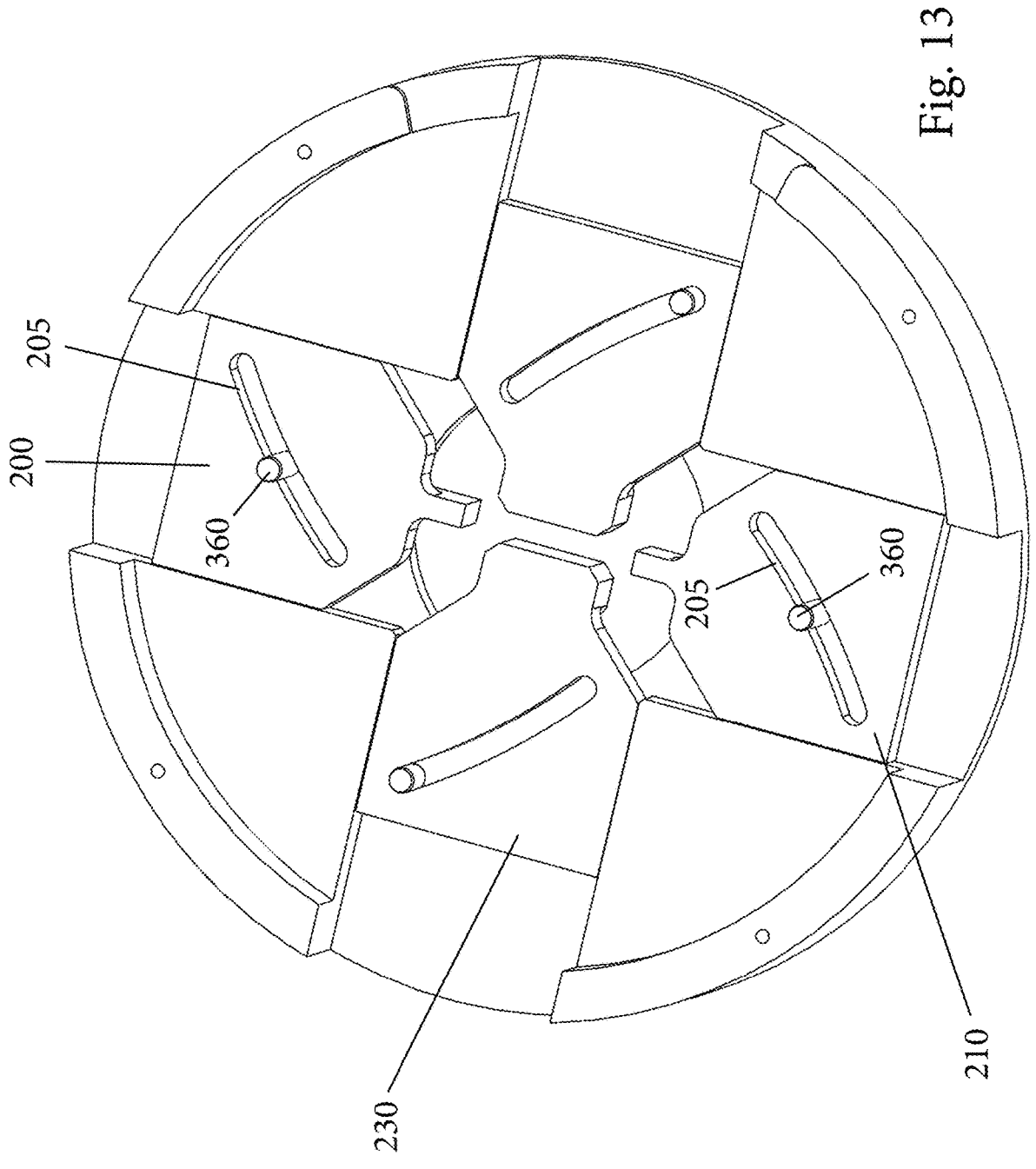
FIG. 13 is a top perspective view showing a plurality of movable arms arranged on a base and being shown in a seventh position.
Figure 14:
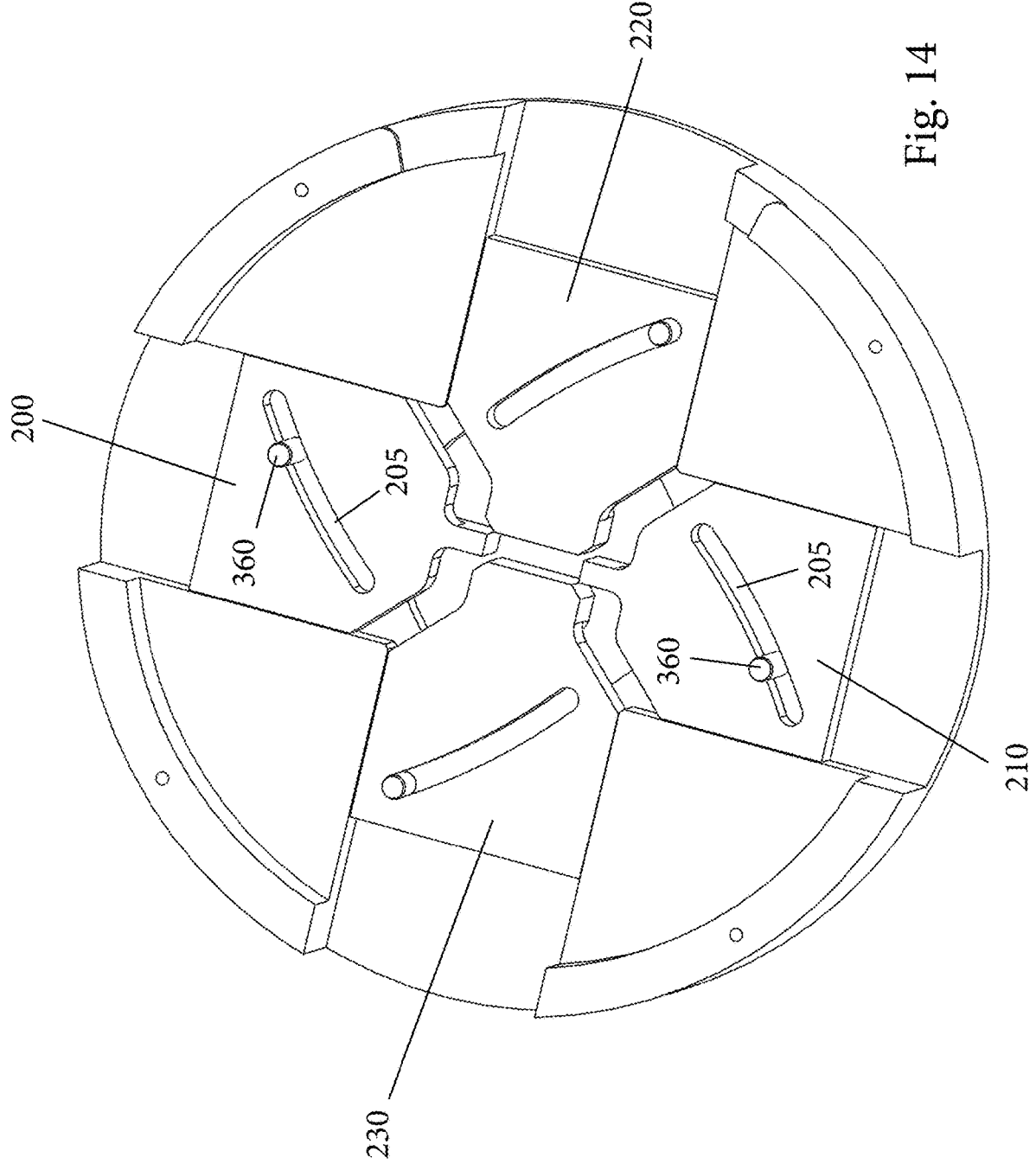
FIG. 14 is a top perspective view showing a plurality of movable arms arranged on a base and being shown in an eighth position.

FIGS. 12-15 show the movement of the pins 360 within the slots 205 associated with the second centering operation. In particular, FIG. 12 shows pins 360 in the initial positions at one end of the slots 205 with the arms 200, 210 fully retracted and FIG. 15 shows the pins 360 in end positions at the opposite ends of the slots 205 with the arms 200, 210 fully extended.

The first centering operation thus results in centering of the gemstone along the first axis (e.g., east-west direction) but this can still result in the gemstone being not centered along the second axis (north-south) and therefore, the subsequent second operation is performed to achieve centering of the gemstone along both axes.

It will be appreciated that the shape and size of the gemstone controls the degree of movement of each of the first actuator 400 and the second actuator 410. In particular, for larger gemstones, such as the one that is shown in FIGS. 22-26, the first and second actuators 400, 410 are moved less within the respective outer notch 396 and window 392 (compared to a smaller gemstone such as the one shown in FIGS. 27-31).

In one embodiment, in the fully extended positions of the arms 200, 210, 220, 230, a ten-point gemstone can be contained within the center open space between the arms 200, 210, 220, 230.

Once the gemstone has been centered on the platform 10, the user can, for some applications, leave the arms 200, 210, 220, 230 in contact with the gemstone or the user can carefully back off the arms 200, 210, 220, 230 from the gemstone by moving the first and second actuators 400, 410 in opposite directions. Movement of the first and second actuators 400, 410 in the opposite second directions results in the outer ring 300 and inner ring 310 moving in the opposite second directions (e.g., counterclockwise direction) and this causes the arms 200, 210, 220, 230 to all move outwardly and away from the centered gemstone located on the platform 10. In applications, where images (e.g., photos) of the gemstone are taken, the arms 200, 210, 220, 230 can be backed off to provide an unobstructed camera view.

In one embodiment, there can be a slight drag incorporated into the device in that rotation of the first actuator 400 (and the outer ring 300) causes a slight movement of the inner ring 310 in the same rotational direction due to friction between the outer ring 300 and the inner ring 310. This slight drag causes the arms 200, 210 to move slightly when the user manually and actively moves the arms 220, 230. For example, as the user moves the arms 220, 230 to the extended positions to center the gemstone, the arms 200, 210 also slightly move to the extended positions. It will be appreciated that any drag feature is optional and can be eliminated by selection of frictionless materials and tolerances. Thus, in one primary embodiment, there is no drag between the two rings when one pair of arms is moved.

It will therefore be appreciated that the present gemstone centering device 100 comprises a manual device that provides precise centering of a loose gemstone on the platform 10. The device 100 is designed to handle and operate on different shaped gemstones and different sizes of gemstones. The use of the two actuators allows the user to quickly center the gemstone with two hands. Adjustment and centering is thus performed along two axes with movement and adjustment along one axis being independent from the other axis.

Incorporation of the Gem Centering Device into a System

As previously mentioned, the present Applicant has a number of patents that cover suitable systems in which the gemstone centering device 100 disclosed herein can be incorporated. However, it will be appreciated that the gemstone centering device 100 can be incorporated into any number of other systems and is not limited to being incorporated into one of Applicant's systems or systems similar thereto. For example, the gemstone centering device 100 can be incorporated into an imaging system that is designed to take images (photos) of the gemstone. The imaging components of the imaging system are positioned relative to the platform 10 (e.g., one above and one below the platform 10) for taking images of the centered gemstone. The imaging components are oriented to image the center of the platform 10 and thus, it is important that the gemstone is centered on the platform 10.

The following patents of the present Applicant disclose suitable systems in which the gemstone centering device 100 can be incorporated. For example, PCT/US2015/032663 is directed to a device for measuring light performance of a gemstone and U.S. Pat. No. 9,488,588 is directed to a system for classifying and recording information with respect to gemstones and providing an owner with an accurate optical identification of the gemstone and provides wholesale and retail establishments, law enforcement, government, and insurance agencies with a verification system. Additional patents include U.S. Pat. Nos. 10,036,711 and 9,746,422. Each of PCT/US2015/032663; U.S. Pat. Nos. 9,488,588; 10,036,711; and 9,746,422 is hereby expressly incorporated by reference in its entirety.

In one embodiment, the gemstone centering device 100 is coupled to the inner gimbal of the gemstone registration system disclosed in U.S. Pat. No. 9,488,588. Movement of the inner gimbal imparts an additional degree of movement of the device 100.

The gemstone centering device 100 can also be part of a gemstone grading system.

It will also be understood that as shown the gemstone centering device 100 can be a standalone, hand-held unit and not integrated into a larger more complex system. In this simpler version, an imaging devices, such as a camera, can be positioned relative to the device 100.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112 (f) are not to be invoked unless the specific terms "means for" or "step for" are recited in a claim.

What is claimed is:

1. A gemstone centering device comprising:
a platform for receiving the gemstone;
a pair of first arms arranged opposite one another above the platform and movable along a first axis, the pair of first arms being configured to move between a retracted position and an extended position in which a distance between first gem contacting surfaces of the pair of first arms is less than in the retracted position of the pair of first arms;
a pair of second arms arranged opposite one another above the platform and movable along a second axis, the pair of second arms being configured to move between a retracted position and an extended position in which a distance between second gem contacting surfaces of the pair of second arms is less than in the retracted position of the pair of second arms; and
a base disposed central to and below the pair of first arms and the pair of second arms, the platform being disposed within the base such that the pair of first arms and the pair of second arms are configured to move across a top surface of the platform for contacting and moving the gemstone across the top surface of the platform and in the extended positions of the pair of first arms and the pair of second arms, the pair of first arms and the pair of second arms are disposed over the platform;
wherein the movement of the pair of first arms is independent from the movement of the pair of second arms.

2. The gemstone centering device of claim 1, wherein the first axis is perpendicular to the second axis.

3. The gemstone centering device of claim 1, wherein the first gem contacting surface has a surface area that is less than a surface area of the second gem contacting surface.

4. The gemstone centering device of claim 1, wherein the pair of first arms and the pair of second arms are arranged 90 degrees apart from one another.

5. The gemstone centering device of claim 1, wherein the base has a plurality of tracks in which the pair of first arms and the pair of second arms are configured to travel along the first and second axes, respectively.

6. The gemstone centering device of claim 5, wherein the base has a center opening with the platform extending across the center opening, each track of the plurality of tracks intersecting the center opening.

7. The gemstone centering device of claim 6, wherein the center opening includes a pair of first notches formed along a periphery thereof and a pair of second notches formed along the periphery, the first notch having a shape different than a shape of the second notch.

8. The gemstone centering device of claim 7, wherein first protrusions of the first arms are received within and axially movable within the first notches and second protrusions of the second arms are received within and axially movable within the second notches.

9. The gemstone centering device of claim 1, wherein the pair of first arms includes first slots formed therein and the pair of second arms includes second slots formed therein, the first slots receiving first pins and the second slots receiving second pins, wherein the movement of the first pins in the first slots imparts axial movement of the pair of first arms along the first axis and the movement of the second pins in the second slots imparts axial movement of the pair of second arms along the second axis.

10. A gemstone centering device comprising:
a platform for receiving the gemstone;
a pair of first arms arranged opposite one another above the platform and movable along a first axis, the pair of first arms being configured to move between a retracted position and an extended position in which a distance between first gem contacting surfaces of the pair of first arms is less than in the retracted position of the pair of first arms;
a pair of second arms arranged opposite one another above the platform and movable along a second axis, the pair of second arms being configured to move between a retracted position and an extended position in which a distance between second gem contacting surfaces of the pair of second arms is less than in the retracted position of the pair of second arms; and
a base having a plurality of tracks in which the pair of first arms and the pair of second arms are configured to travel along the first and second axes, respectively, wherein the second pins are part of an outer ring that is configured to rotate within the base and the first pins are part of an inner ring that is configured to rotate within the base and is configured to rotate independent from the outer ring, each of the inner ring and outer ring having a center opening;
wherein the movement of the pair of first arms is independent from the movement of the pair of second arms;
wherein the pair of first arms includes first slots formed therein and the pair of second arms includes second slots formed therein, the first slots receiving first pins and the second slots receiving second pins, wherein the movement of the first pins in the first slots imparts axial movement of the pair of first arms along the first axis and the movement of the second pins in the second slots imparts axial movement of the pair of second arms along the second axis.

11. The gemstone centering device of claim 10, wherein the first pins protrude downwardly from a bottom face of the inner ring and the second pins protrude downwardly from a bottom face of the outer ring, the inner ring being received within a recessed space of the outer ring.

12. The gemstone centering device of claim 11, wherein the outer ring includes a pair of slots through which the first pins pass to allow the first pins to be received in the first slots, the second pins being formed between ends of the slots of the outer ring.

13. The gemstone centering device of claim 10, wherein the outer ring seats against elevated surfaces of the base located between the plurality of tracks, the outer ring being disposed above the pair of first arms and the pair of second arms.

14. The gemstone centering device of claim 10, further including a first actuator coupled to the outer ring and a second actuator coupled to the inner ring.

15. The gemstone centering device of claim 14, wherein the first actuator comprises a first upstanding lever and the second actuator comprises a second upstanding lever.

16. The gemstone centering device of claim 10, further including a cover that is coupled to the base and covers the inner and outer rings, the cover having a center opening that aligns with the center openings of the inner ring and the outer ring.

17. The gemstone centering device of claim 16, further including a first actuator coupled to the outer ring and a second actuator coupled to the inner ring, the cover having a window formed therein through which the second actuator passes and an outer notch open along a periphery of the cover through which the second actuator passes.

18. The gemstone centering device of claim 1, wherein in the extended positions of the pair of first arms and the pair of second arms, the first gem contacting surfaces are between the second gem contacting surfaces.

19. The gemstone centering device of claim 1, wherein each of the first gem contacting surface and the second gem contacting surface is a planar surface.

* * * * *